United States Patent
Newman et al.

[19]

[11] Patent Number: 6,157,972
[45] Date of Patent: Dec. 5, 2000

[54] APPARATUS AND METHOD FOR PROCESSING PACKETIZED INFORMATION OVER A SERIAL BUS

[75] Inventors: Merril Newman, Carrollton; Brian T. Deng, Richardson; David E. Kimble, Carrollton, all of Tex.

[73] Assignee: Texas Instruments Incorporated, Dallas, Tex.

[21] Appl. No.: 09/196,903

[22] Filed: Nov. 20, 1998

Related U.S. Application Data

[60] Provisional application No. 60/067,618, Dec. 5, 1997.

[51] Int. Cl.$^7$ .................................................. G06F 13/00

[52] U.S. Cl. .......................................... 710/100; 370/912

[58] Field of Search ............................... 710/4, 9, 10, 52, 710/63, 100, 104, 106; 709/221, 222, 250, 253; 713/100; 714/49, 53, 799, 819, 821, 1; 370/257, 408, 429, 912; 340/825.52

[56] References Cited

U.S. PATENT DOCUMENTS

| | | |
|---|---|---|
| 5,724,517 | 3/1998 | Cook et al. . |
| 5,764,930 | 6/1998 | Staats . |
| 5,919,261 | 7/1999 | Aoki et al. . |

*Primary Examiner*—Gopal C. Ray
*Attorney, Agent, or Firm*—Alan K. Stewart; Wade James Brady; Frederick J. Telecky, Jr.

[57] ABSTRACT

An IEEE 1394 serial bus, during bus initialization, transmits a plurality of self-ID packets across the bus. Each node on the bus is operable to receive the self-ID packet from the bus (140) via receiver (146). Asynchronous packets and isochronous packets are stored in a FIFO (166) for later use by a host interface (150). The self-ID packets are verified by a hardware circuit (170) that provides verification of the self-ID packets as they are received without requiring the software to later evaluate the self-ID packets from storage in the FIFO (166). If an error is determined, this is stored in registers (164) for later processing by the host interface (150).

9 Claims, 13 Drawing Sheets

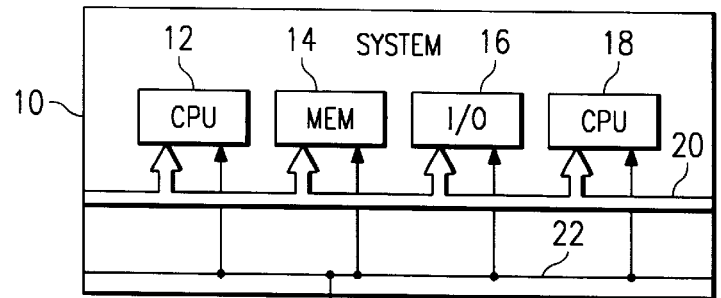
FIG. 1
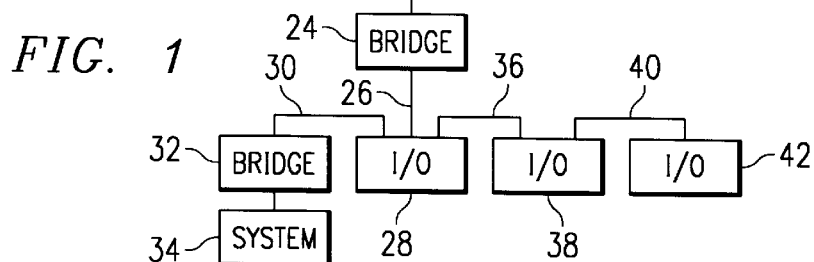
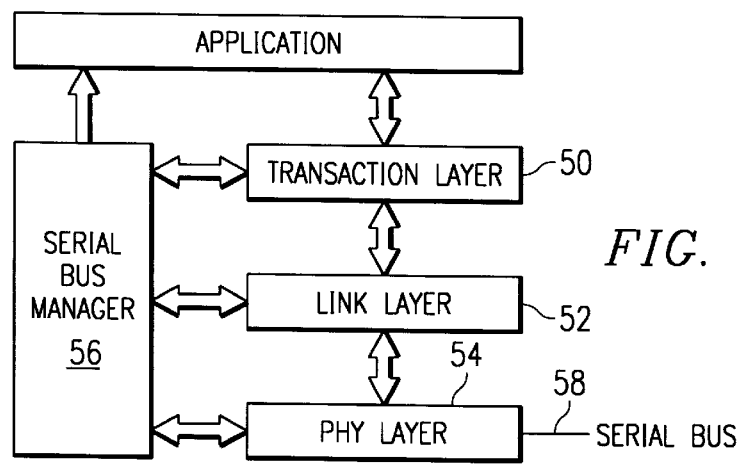
FIG. 2
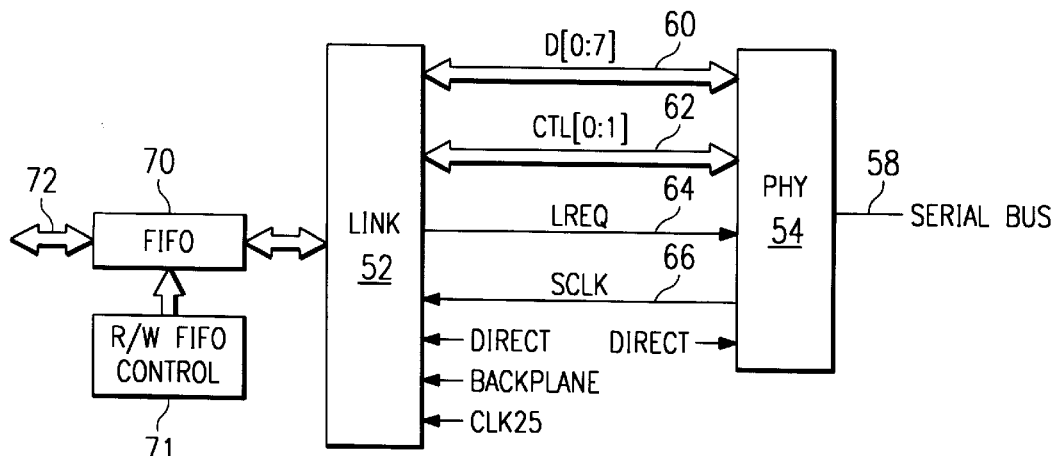
FIG. 3

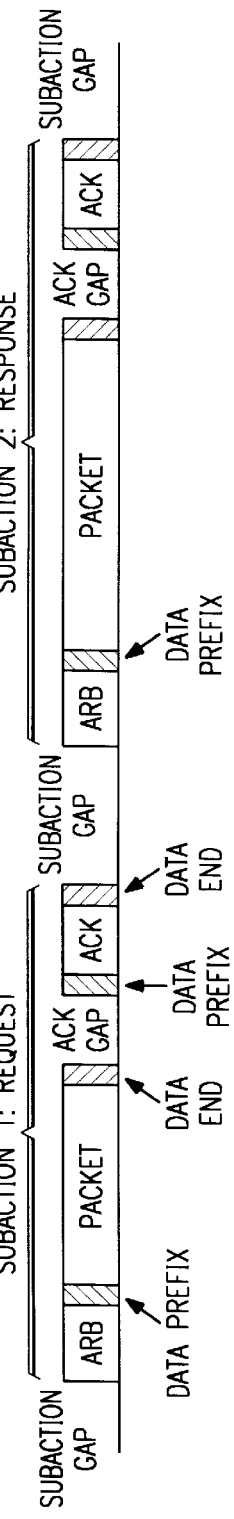
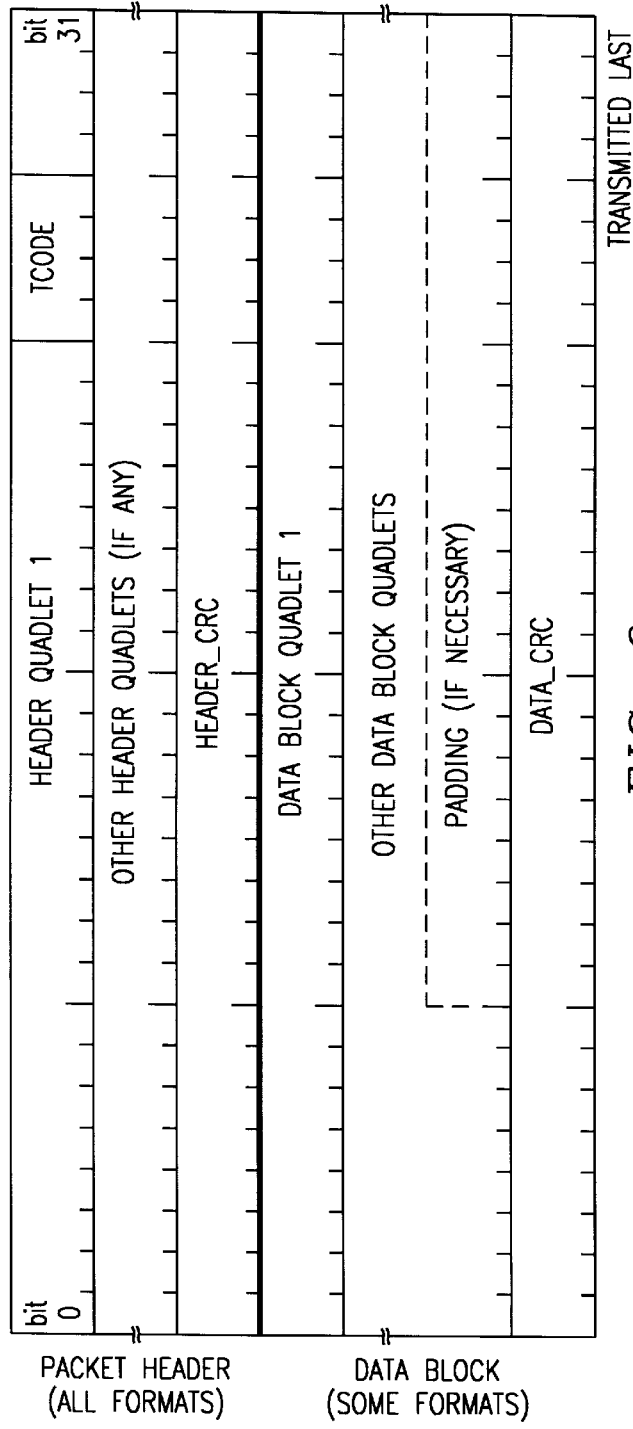

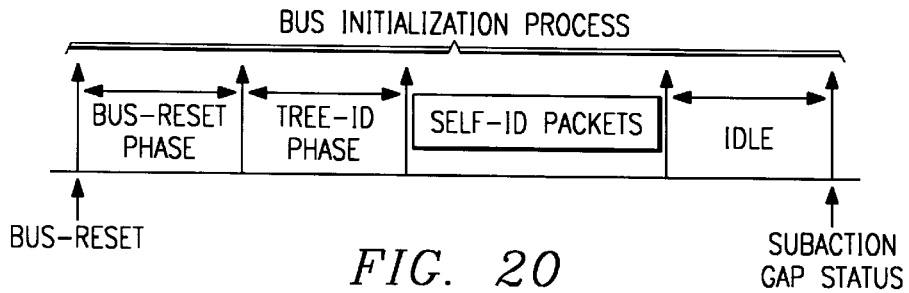
FIG. 20
| 10 | phy_ID | 0 | L | gap_cnt | sp | del | c | pwr | p0 | p1 | p2 | i | m |
logical inverse of first quadlet
self-ID packet #0
| 10 | phy_ID | 1 | n | rsv | pa | pb | pc | pd | pe | pf | pg | ph | r | m |
logical inverse of first quadlet
self-ID packet #1, #2 and #3
| | n | pa | pb | pc | pd | pe | pf | pg | ph |
|---|---|---|---|---|---|---|---|---|---|
| pkt #1 | 0 | p3 | p4 | p5 | p6 | p7 | p8 | p9 | p10 |
| pkt #2 | 1 | p11 | p12 | p13 | p14 | p15 | p16 | p17 | p18 |
| pkt #3 | 2 | p19 | p20 | p21 | p22 | p23 | p24 | p25 | p26 |
for n=3 through 7, fields pa through ph are reserved
FIG. 21
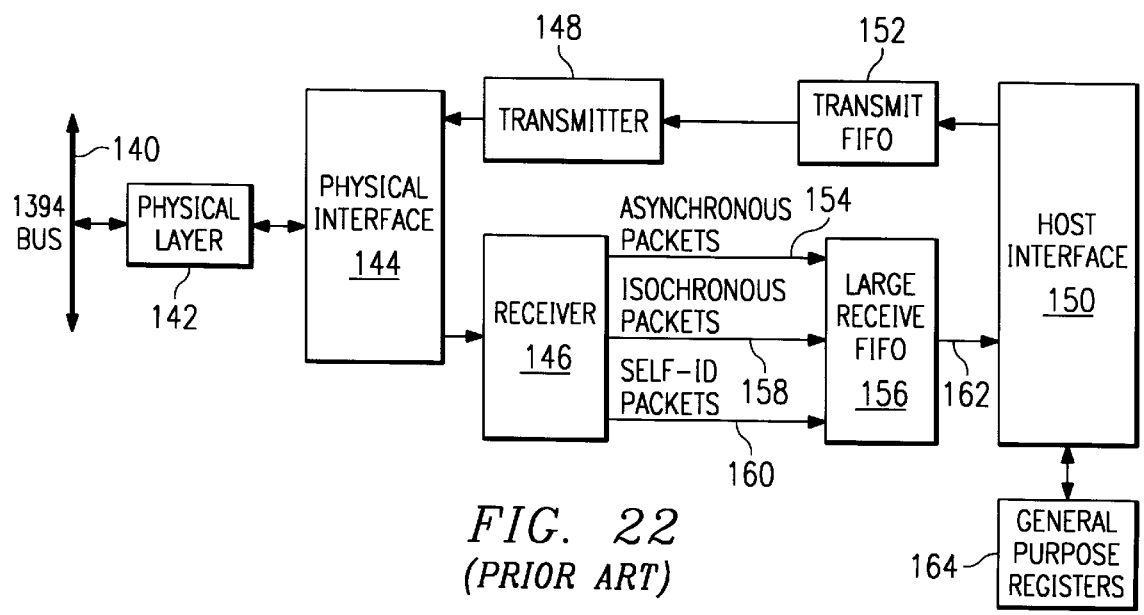
FIG. 22 (PRIOR ART)

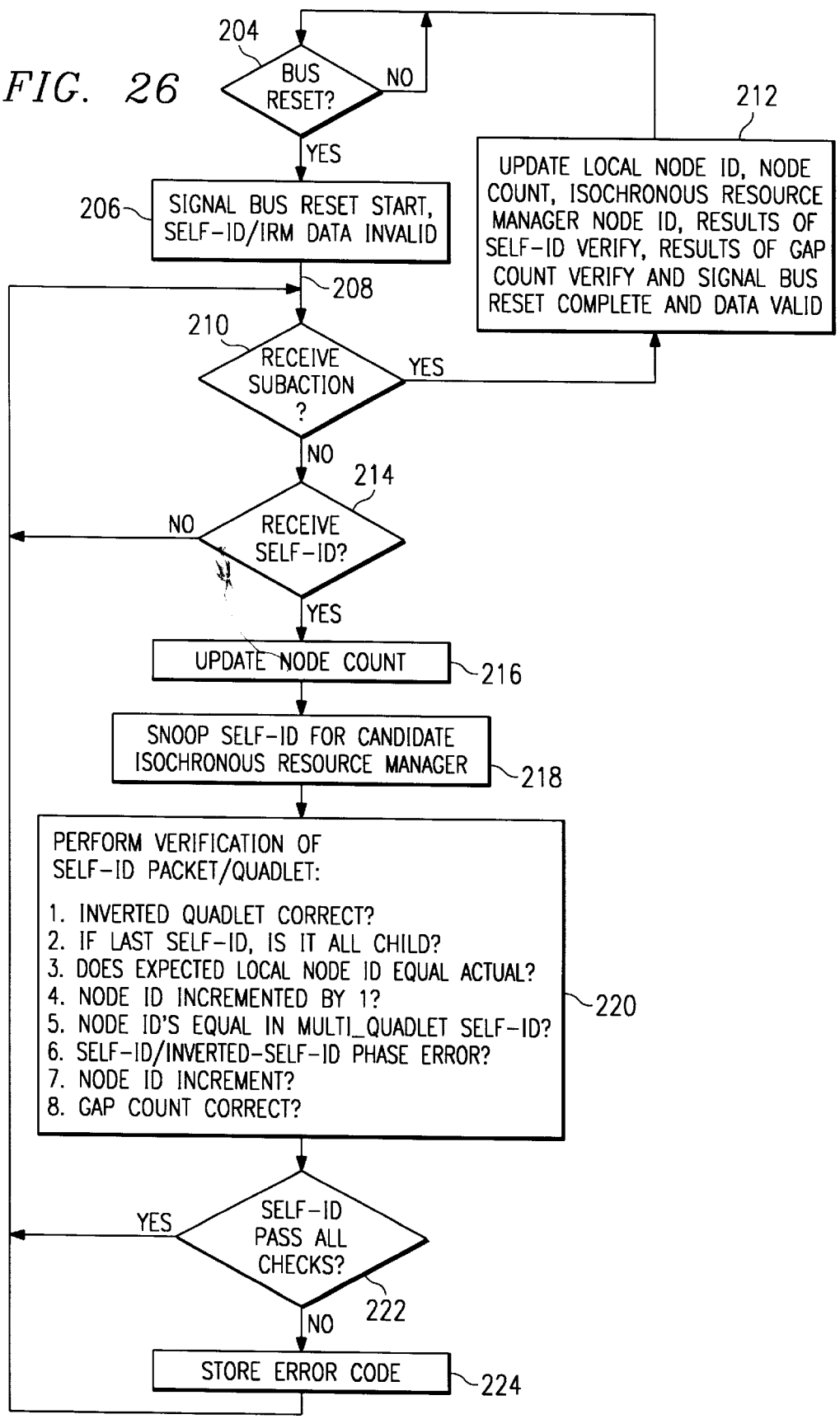

APPARATUS AND METHOD FOR PROCESSING PACKETIZED INFORMATION OVER A SERIAL BUS

This application claims priority under 35 USC §119 (e) (1) of provisional application number 60/067,618, filed Dec. 5, 1997.

TECHNICAL FIELD OF THE INVENTION

The present invention pertains in general to receiving data from a serial bus and, more particularly, to a method for identifying nodes on the serial bus.

BACKGROUND OF THE INVENTION

The IEEE has approved a new standard under IEEE 1394 for a high-performance serial bus cable environment that includes a network of logical nodes connected by point-to-point links called physical connections. The physical connections consist of a port on each of the nodes and a cable disposed therebetween. A node can have multiple ports, which allows a branching multi-hop interconnect. The limitations on this topology are set by the requirement for the fixed round-trip time required for the arbitration protocol. The default timing set after a bus reset is adequate for 16 cable hops, each of 4.5 meters for a total of 72 meters. The maximum number of nodes supported on a single bus is 63.

Whenever a node is added to or removed from the 1394 serial bus, a bus reset occurs and forces all nodes to a known state. After a bus reset, the tree identify (ID) process translates the general network topology into a tree, where one node is designated a root, and all the physical connections are labeled as either a parent, a child or as unconnected. The unconnected ports are labeled as "off" and do not participate any further. The tree must be acyclic, meaning no loops allowed; otherwise, the tree ID process win not be completed.

The 1394 cable environment supports multiple data rates of 98.304, 196.608, 393.216 megabits per second. The lowest speed is known as the base rate, and all ports that support a higher data rate must also support the lower data rate. Nodes capable of data rates greater than the base rate exchange speed information with its peers through its attach ports during the speed signaling phase of normal bus arbitration. If a peer node is incapable of receiving high-speed data, then data will not propagate down that path. Data will only be propagated down paths that support the higher data rate.

During data packet transmission, the source node sends a speed code, format and transaction codes, addresses of the source and destination nodes and data in a packet form. The destination field in this packet is utilized by each node's link layer to determine if it is the recipient of the transmitted data. The maximum speed at which a data packet can be transmitted depends upon the bus topology and the data transmission speed supported by the nodes on the bus. To determine the optimum speed at which a data packet may be sent, the maximum supported speeds of the transmitting and receiving nodes, as well as the maximum speeds of any nodes connected between these nodes, must be determined. The optimum speed for data transmission is equal to the highest speed which is supported by all the nodes, which are required to participate in the transmission of the data packet.

The IEEE 1394 bus has a defined topology which is referred to as acyclic topology in that there are no loops in the bus. The bus is comprised of a plurality of nodes which are interconnected by physical connections. This is referred to as the cable topology. There is also a backplane topology which allows a plurality of nodes to exist on a common backplane. However, all of the nodes must have some recognizable ID on the bus. In the IEEE 1394 standard, there is a defined sequence that is processed to add a new node to the system. This is due to the fact that, unlike an Ethernet® network card, the node in the IEEE 1394 bus does not have a unique physical ID due to a hardware setting. As such, the network nodes will configure themselves, determine the architecture of the system, i.e., the tree structure of the network, and then determine their ID on the network.

Whenever a new device is added to the serial bus, it must obtain a logical address on the bus. To do this, it initiates a bus reset operation, which is followed by a tree identification operation. After the tree structure is determined, then the system will initiate transmission of self ID packets from each of the nodes in a defined order. This defined order allows only one node at a time to generate self ID packets, with the other nodes receiving the self ID packets for storage therein. During the self ID process, each node will receive all of the self ID packets that are transmitted on the bus and store them in a buffer. After storage, they must evaluate the self ID packets. If, for some reason, there is some problem with the integrity of a received self ID packet from another node, the receiving node will then initiate a bus reset. The disadvantage to the present systems are that they require sufficient memory to store all of the self ID packets from all of the nodes during the self ID portion of a bus initialization operation prior to evaluation thereof. Once all of the self ID packets have been received and stored, they are evaluated from an integrity standpoint and then, if there is a problem with integrity, a bus reset is sent to all of the other nodes. This requires a significant amount of storage and software for processing.

SUMMARY OF THE INVENTION

The present invention disclosed and claimed herein comprises a method for processing packetized identification information over a serial bus carrying data packets. This packetized identification information is utilized by each node in a network for self-identifying itself on the network. Each node includes a monitor for monitoring the data packets received from the serial bus during a self-ID process. The node then recognizes that the data packet received is a self-ID packet, which self-ID packet comprises data placed on the serial bus by other nodes on the serial bus to identify those other nodes to all remaining nodes on the serial bus. Each node processes the recognized self-ID packets with a hardware processor to verify the integrity of the received self-ID packet in accordance with predetermined criteria. An error signal is generated if any of the self-ID packets fails to verify in accordance with the predetermined criteria.

In another aspect of the present invention, the processing operation occurs upon receipt of the self-ID packet with substantially no buffering of the self-ID packet. Therefore, minimal storage is required. Additionally, gap count information is provided in each of the self-ID packets, which gap count information relates to synchronization information. The synchronization information is extracted from the self-ID packet for each self-ID packet and compared with the synchronization for gap count information of the other self-ID packets. If they do not match, this will constitute an error which will be generated as an error signal.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates an overall block diagram of a system utilizing the IEEE 1394 serial bus architecture;

FIG. 2 illustrates a simplified block diagram of the various protocol layers in the IEEE 1394 bus;

FIG. 3 illustrates a more detailed block diagram of the physical and link layers which interface with the FIFO;

FIG. 4 illustrates an example of an asynchronous transmission over the serial bus;

FIG. 6 illustrates a primary packet data format;

FIG. 20 illustrates a diagrammatic view of the timing diagram for the bus initialization process;

FIG. 21 illustrates a diagrammatic view of a self ID packet;

FIG. 22 illustrates a block diagram of a prior art serial bus transmitter/receiver;

FIG. 26 illustrates a flow chart depicting the operation of the isochronous resource manager protocol processor.

DETAILED DESCRIPTION OF THE INVENTION

Figure 5:
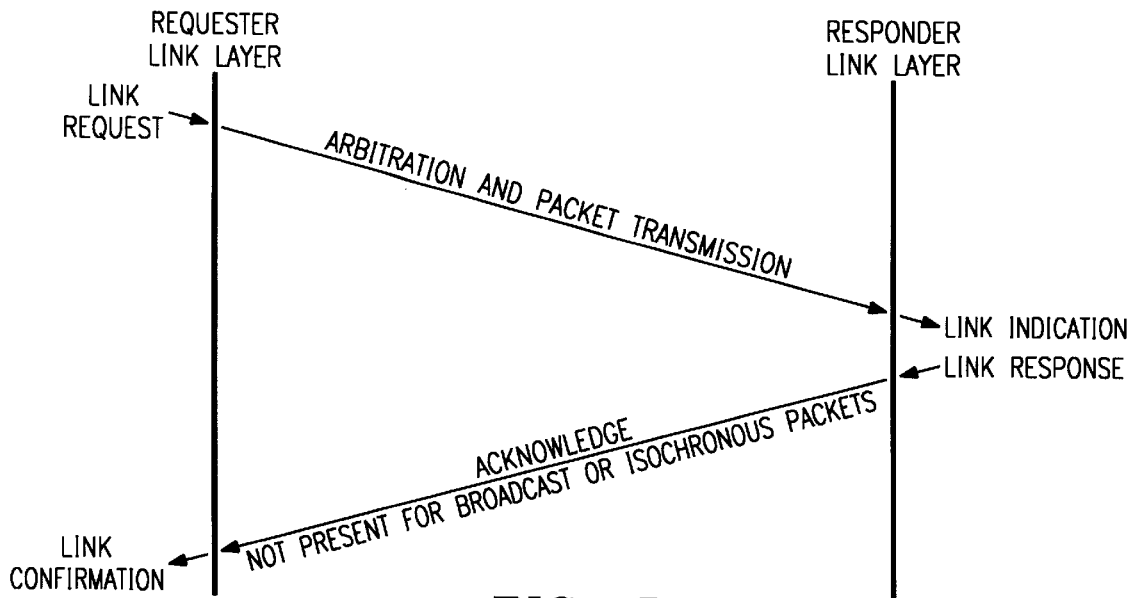
FIG. 5 illustrates a diagrammatic view of how the link layer services a transaction.

Referring now to FIG. 1, there is illustrated a block diagram of a system utilizing the serial bus architecture that is defined as the IEEE 1394 serial bus. This is defined in the "IEEE Standard for a High-Performance Serial Bus," IEEE STD 1394–1995, which is incorporated herein by reference. A module 10 is illustrated, which module 10 includes a CPU 12, a memory 14, an input/output (I/O) 16 and a CPU 18. The CPU 12, memory 14, I/O 16 and CPU 18 all comprise units within the system. Each of the units 12–18 interfaces with a parallel bus 20, which is a system bus that is indigenous to the module 10. In addition, each of the units 12–18 interfaces with a serial bus 22 which is referred to as a "backplane." The serial bus 22 operates in accordance with the IEEE 1394 standard and is also interfaced external to the system with a bridge 24. The bridge 24 and the module 10 each comprise logical nodes on the serial bus. In general, the serial bus architecture is defined in terms of logical nodes, the node being an addressable entity. Each of those can be independently reset and identified, and more than one node may reside on a single module, and more than one unit may reside in a single node. A node is therefore a logical addressing concept wherein a module is a physical device which can consist of more than one node that share a physical interface. The address space of a single node can be directly mapped to one or more units. A unit can be a logical entity, such as a disk controller, memory, CPU, etc. Within a given unit, there may be multiple subunits, which can be accessed through independent control registers or uniquely addressed with direct memory access (DMA) command sequences.

Referring further to FIG. 1, it can be seen that there are two environments, one within the module 10 utilizing the backplane 22, referred to as the "backplane environment," and the other being a "cable environment." The nodes interfacing with the cable environment have "ports" associated therewith. The bridge node 24 is such a node which interfaces on one side to the backplane serial bus 22 and on the other side to a cable 26 which interfaces to a single I/O node 28 through one port therein. The I/O node 28 has two other ports, one of which is connected through a cable serial bus 30 to a bridge node 32. The bridge node 32 is similar to the bridge node 24 in that it interfaces with another system 34, this being a module. The system node 34 can be substantially identical to the system 10, or any other type of system employing a backplane. The third port of the I/O node 28 interfaces through a cable serial bus 36 to one port of an I/O node 38, the other port thereof interfaced through a cable serial bus 40 to an I/O node 42.

The cable environment in general is a physical topology that provides a noncyclic network with finite branches and extent. The medium consists of two conductor pairs for signals and one pair for power and ground that connect ports on different nodes. Each port consists of terminators, transceivers, and simple logic. The cable and ports act as bus repeaters between the nodes to simulate a single logical bus. The backplane environment, by comparison, comprises a multidrop bus. This consists of two single-ended conductors running the length of the backplane in the module. Connectors distributed along the bus allow nodes to "plug into" the bus. This system makes use of wired-OR logic that allows all nodes to assert the bus.

Referring now to FIG. 2, there is illustrated a block diagram of the serial bus protocol. The serial bus protocol is comprised of three stack layers, a transaction layer 50, a link layer 52 and a physical layer 54 labeled "PHY." The transaction layer defines a complete response-response protocol to perform the bus transactions required to support the CSR architecture (control and status registers). This provides operations of read, write and lock. The link layer 52 provides an acknowledge datagram (a one-way data transfer with confirmation of request) service to the transaction layer 50. It provides addressing, data checking, and data framing for packet transmission and reception. The link layer 52 also provides an isochronous data transfer service directly to the application, including the generation of a "cycle" signal utilized for timing and synchronization. One link layer transfer is called a "subaction."

The physical layer 54 provides three major functions. It translates the logical symbols utilized by the link layer 52 into electrical signals on the different serial bus media. It guarantees that only one node at a time is sending data over the bus by providing an arbitration service. It also defines the mechanical interfaces for the serial bus. For each environment, there is provided a different physical layer, the cable and backplane environments. The cable physical layer also provides a data resynch and repeat service and automatic bus initialization.

In addition to the three layers, there is also provided a serial bus management block 56 that provides the basic control functions and standard CSRs needed to control nodes or to manage bus resources. This includes a number of components, a bus manager component which is only active at a single node that exercises management responsibilities over an entire bus, a node controller component, and an isochronous resource manager that centralizes the services needed to allocate data with another isochronous resource. An isochronous resource is a resource having the characteristics of a time-scale or signal that has time intervals between consecutive significant instances with either the same duration or durations that are integral multiples of the shortest duration. For the purposes of the present invention, the physical layer interfacing with the serial bus 58 and the link layer 52 will be interfaced with a receive buffer (not shown).

Referring now to FIG. 3, there is illustrated a block diagram of the interface between the physical layer 54 and the link layer 52. The physical layer 54 interfaces with the serial bus 58 and is operable to receive data therefrom. Data is passed to and from the link layer 52 through an 8-bit bi-directional data bus 60. Two control bits are passed between the physical layer 54 and the link layer 52 over a control bus 62. A link request is transferred to the physical 54 from the link layer 52 through a request line 64, but with a system clock signal, SCLK, transferred from the physical layer 54 to the link layer 52, the physical layer 54 recovering this clock.

Hereinafter, data rates are referred to in multiples of 98.304 Mbit/s. The interface provided in the IEEE 1394 in the cable environment will support the following data rates: 100 Mbit/s, 200 Mbit/s and 400 Mbit/s. The backplane environment will support 25 Mbitts and 50 Mbit/s. These rates are actually "bit" rates, independent of the encoding scheme. The actual clock rate in a redundant encoding scheme is referred to as a "baud" rate and is independent of the clock rate of this interface.

The physical layer 54 has control over the bi-directional pins for transferring the data and the control bits. The link layer 52 only drives these pins when control is transferred to it by the physical layer 54. The link performs all unsolicited activities through a dedicated request pin on line 64. The possible actions that may occur on the interface are categorized as transmit, receive, status and request. The SCLK is driven by the physical layer 54 and is generally synched to the serial bus clock at a rate of 49.152 MHz. There is provided a backplane input on the link layer 52 which, if set high, indicates that the physical layer is in a backplane environment. Another input, a Clk25 input, when set high, forces the SCLK output from the physical layer 54 on the line 66 to a value of 24.576 MHz.

When data is carried between the two chips, the width of the data bus 60 depends on the maximum speed of the connected physical layer 54, two bits for every 100 Mbit/s. Therefore, packet data for a 100 Mbit/s transmit utilizes D[0:1], 200 Mbit/s transfers utilize D[0:3], and 400 Mbit/s transfers utilize the full D[0:7]. The unused D[n] signals are driven low. The control bus 62 always carries two bits. Whenever control is transferred between the physical layer 54 and the link layer 52, the side surrendering control always drives the control and data pins to a logic "0" level for one clocks before tri-stating its output buffers.

As noted above, there are four basic operations that may occur in the interface: request, status, transmit and receive. To request the bus or access a register in the physical layer 54, the link layer 52 sends a short serial stream to the physical layer 54 on the request pin 64. When the physical layer 54 has status information to transfer to the link layer 52, it will initiate a status transfer. The physical layer 54 will wait until the interface is idle to perform this transfer, and it will initiate the transfer by asserting a status bit on the control bus 62. It will also provide at the same time the first two bits of status information on D[0:1]. When the link requests access to the serial bus through the request line 64, the physical layer 54 arbitrates for access to the serial bus 58. When it wins the arbitration, it will then grant the bus to the link layer 52 by asserting "transmit" on the control bus 62 for one cycle of the SCLK. It will then be idle for a single cycle. After sampling the "transmit" state from physical layer 54, the link layer 52 will then take over control of the interface by asserting either a "hold" or a "transmit" on the control bus 62. During a receive operation, whenever the physical layer 54 sees a "data-on" state on the serial bus 58, it initiates a receive operation by asserting "receive" on the control bus 62 and a logic "1" on each of the data pins. Physical layer 54 then indicates the start of a packet by placing the speed code on the data pins. For 100 Mbit/s, the data bits will be "00xxxxxx," and for 200 Mbit/s, it will be "0100xxxx," with 400 Mbit/s being "01010000," the value "x" being a non operation.

The link layer 52 will interface with a buffer in the form of a FIFO 70, which is controlled by a read/write FIFO control block 71 that defines the position of the read and write pointers and all accesses in and out of the FIFO. The other side of the FIFO 70 is interfaced with the host bus 72, which host bus 72 is a 32-bit bus.

Referring now to FIG. 4, there is illustrated a subaction in the link layer 52 for an asynchronous transmission of a packet. This subaction is in the form of a request and a response. There is provided an arbitration sequence which is transmitted by a node that wishes to transmit a packet, this being transmitted to the physical layer 54 to gain control of the bus 58. The physical layer 54 may then respond immediately if it already controls the bus. This is followed by a data packet transmission which, for asynchronous subactions, involves the source node sending a data prefix signal (including a speed code, if needed), addresses of the source node and destination nodes, a transaction code, a transaction label, a retry code, data, one or two cyclic redundancy checks (CRCs), and a packet termination (either another data prefix or a data end signal). This is all followed by an acknowledgment field wherein a uniquely addressed destination returns a code indicating to the transmitting node the action taken by the packet receiver. Each of these asynchronous subactions is separated by periods of idle bus called "subaction gaps." This gap is disposed between the packet transmission and acknowledgment reception. This "ack-gap" is of varying lengths depending upon where the receiver is on the bus with respect to the senders of the link request and acknowledgment (ack). However, the maximum length of the ack-gap is sufficiently shorter than a subaction gap to ensure that other nodes on the bus will not begin arbitration before the acknowledgment has been received.

Referring now to FIG. 5, there is illustrated a diagrammatic view of the manner in which the link layer 52 services a request. As noted above, the link layer 52 utilizes the request, indication, response and confirmation service primitives. The request primitive is utilized by a link requestor to transfer the packet to a link responder. An indication primitive indicates the reception of a packet by a link responder. A response primitive indicates the transmission of an acknowledgment by a link responder, and the confirmation primitive indicates the reception of the acknowledgment by the link requestor. Once the link request has been made, the system goes through an arbitration and packet transmission to the receiving node, which then provides a response back in the form of an acknowledgment to the requesting link layer, which will then confirm transmission.

Referring now to FIG. 6, there is illustrated a register map for a packet that is transmitted. The packet is configured with a header that contains a plurality of quadlets. Typically, the first quadlet will contain the physical ID and the last quadlet will contain the header CRC. The header packet is followed by a data block which consists of a plurality of data quadlets with the last quadlet being a data CRC quadlet. The packet header in the first quadlet thereof contains a transaction code which defines the packet type of a primary packet. The transaction packet code specifies the packet format and the type of transaction that shall be performed. This could be such things as a write request for a data quadlet, a write request for a data block, read requests for data quadlets and data blocks, and read responses for data quadlets and data blocks. The asynchronous data packet noted above with respect to FIG. 4 is a primary data packet.

Figure 7:
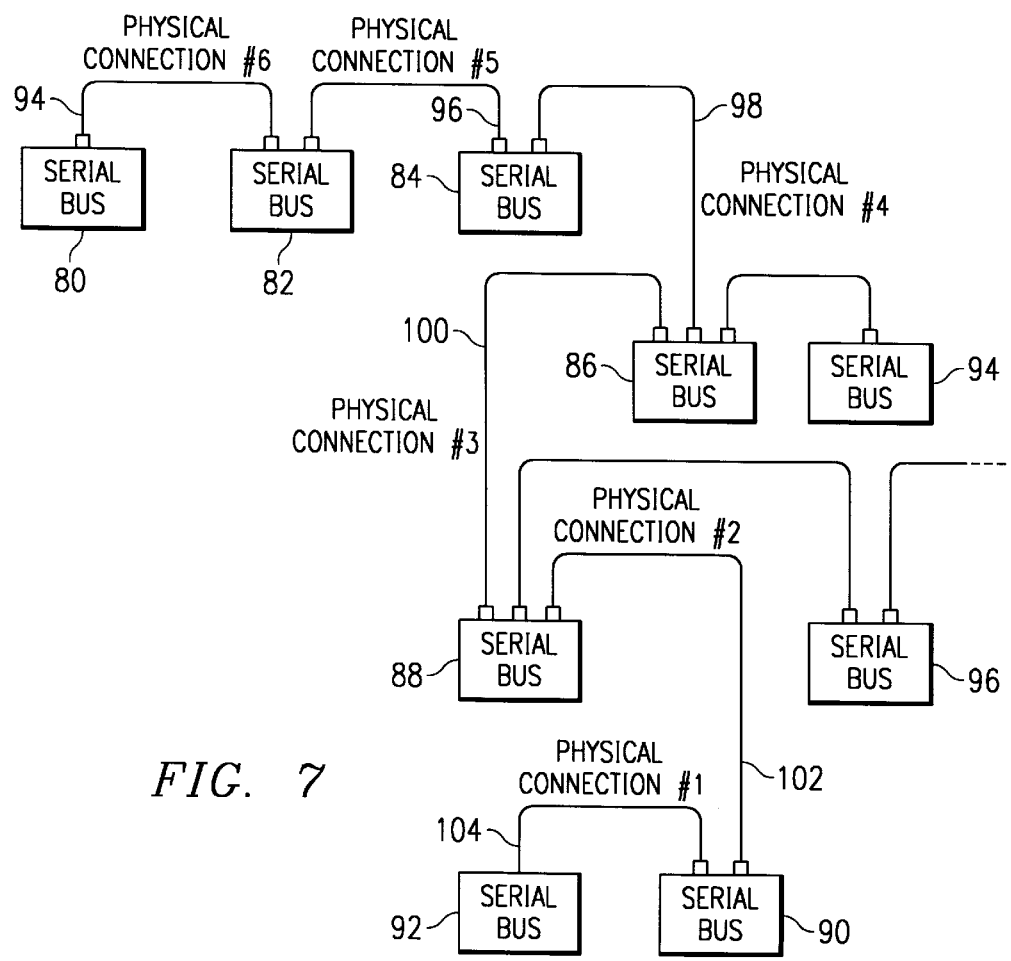
FIG. 7 illustrates a diagrammatic view of the acyclic topology for a physically connected IEEE 1394 bus.

Referring now to FIG. 7, there is illustrated a block diagram of an "acyclic" topology for the physical interconnection between nodes with cables, this being differentiated from a backplane environment. This topology is referred to as an "acyclic" topology due to the fact that there are no loops. There are provided a plurality of nodes 80–96 which are connected in a tree configuration. This, as described above, is a cable medium, wherein the serial bus utilizes point-to-point physical connections between nodes with a pair of differential signals wherein the use of each pair is different depending upon whether the node is arbitrating, transmitting data, or receiving data. Each physical connection consists of a port on each node and a cable disposed therebetween. The actual cable assemblies utilize six conductor cables with small connectors. The limitations on this system are set by the requirement of the arbitration protocol for a fixed round-trip time for signals. Also, the topology must be "acyclic" (no closed loops). Any closed loops will prevent the tree-ID process described hereinbelow from completing.

Referring back to FIG. 7, the node 80 has only a single port which is connected to one port on a node 82, a two-port node, through a physical connection 94. The other port of node 82 is connected through a physical connection 96 to one port of the two-port node 84. The other port of node 84 is connected through a physical connection 98 to one port of node 86, a three-port node. A second port of node 86 is connected through a physical connection 100 to one port of node 88, a three-port node. A second port of node 88 is connected through a physical connection 102 to one port of node 90, a two-port node. The other port of node 90 is connected through a physical connection 104 to node 92. In addition, there is provided a physical connection from the third port of node 86 to node 94, and also from the third port of node 88 to node 96. It can be seen that there are six physical connections between node 80 and node 92, these being physical connections 94, 96, 98, 100, 102 and 104.

During packet transmissions, there is only a single node transmitting on the bus, such that the entire media can operate in a half-duplex mode utilizing two signals: Data and Strb. NRZ data is transmitted on Data and then accompanied by the Strb signal, which changes states whenever two consecutive NRZ data bits are the same, ensuring that a transmission occurs on either Data or Strb for each data bit. A clock that transitions each bit period can be derived from the exclusive-or of Data with Strb. The arbitration mode guarantees that only one node will be transmitting at the end of arbitration. In this arbitration process, typically the node with the highest natural priority (highest arbitration number on a backplane and closest to the root on a cable) will always win.

In a cable environment, the root is considered to be the highest node in the tree architecture. During asynchronous arbitration, the serial bus adds a simple scheme that splits the access opportunities evenly among competing nodes. This is provided by a fairness protocol that is based on the concept of a fairness interval. A fairness interval consists of one or more periods of bus activity separated by short idle periods called subaction gaps, and is followed by a longer period referred to as an arbitration reset gap. At the end of each subaction gap, bus arbitration is utilized to determine the next node to transmit an asynchronous packet.

The various ports for interfacing with the physical connections in a given cable environment are provided by the physical layer, this physical layer also providing the arbitration logic, which provides access to the bus. However, to converse with each other, not only must the tree architecture be known, i.e., the cable configuration or network configuration, but each node on the network must have a logical identifier, i.e., an ID.

Cable configuration is achieved in three phases: bus initialization, tree identification and self identification. During this process, a tree-like topology is built; each node is assigned a physical node number and also sends node-specific information that is utilize by a management layer.

Figure 8:
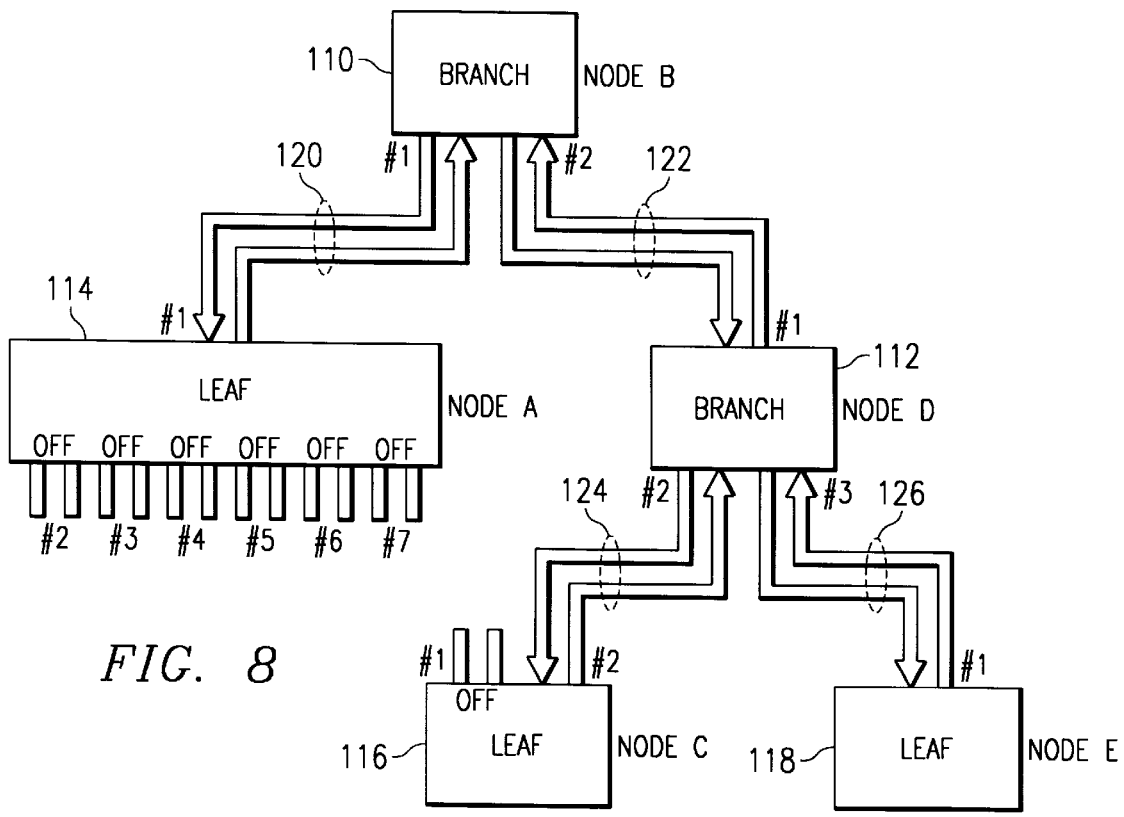
FIG. 8 illustrates a diagrammatic view of the cable state after a bus initialize.

Referring now to FIG. 8, there is illustrated a diagrammatic view of a typical arrangement of nodes in a tree architecture. Whenever a node joins the bus, a bus reset signal forces all nodes into a special state that clears all topology information and initiates the next phase. After bus initialization, the only information known to a node is whether it is a branch (more than one directly connected neighbor), a leaf (only a single neighbor) or isolated (unconnected). In FIG. 8, there are provided two branch nodes 110 and 112, and three leaf nodes 114, 116 and 118. The branch node 110 is illustrated as having two ports connected through a physical connection 120 to a single port on node 114. A physical connection 122 is provided between a second port on node 110 to one port on node 112. A physical connection 124 is provided between a port on node 112 to a port on node 116. Similarly, a physical connection 126 is provided between a port on node 112 to a port on node 118. Node 114 is labeled "Node A," Node 110 is labeled "Node B," Node 116 is labeled "Node C," Node 112 is labeled "Node D" and Node 118 is labeled "Node E." In the illustrated embodiments, the physical connections are represented by two arrows which basically are an abstract representation of the line state signaling. They do not imply that the signaling utilizes different wire pairs for two directions. In fact, both directions use both pairs, and the receive signal is the result of the dominance of "1" over "z." In addition, there is no particular order to the numbering; it is just a way for this example to give each port a unique label.

After a bus initialize, a tree-ID process is entered which translates the general network topology into a tree topology, where one node is designated a root and all of the physical connections have a direction associated with them pointing toward the root node. The direction is set by labeling each connected port as a "parent" port (connected to a node closer to the root) or "child" port (connected to a node further from the root). Any unconnected ports are labeled "off" and do not participate in further arbitration processes. Any loop in the topology is detected by a configuration time-out in the tree-ID process. When the tree-ID process is complete, the example configuration will have each connected port labeled child (pointing to a child node) or parent (pointing to its parent node). This is illustrated in FIG. 9.

Figure 9:
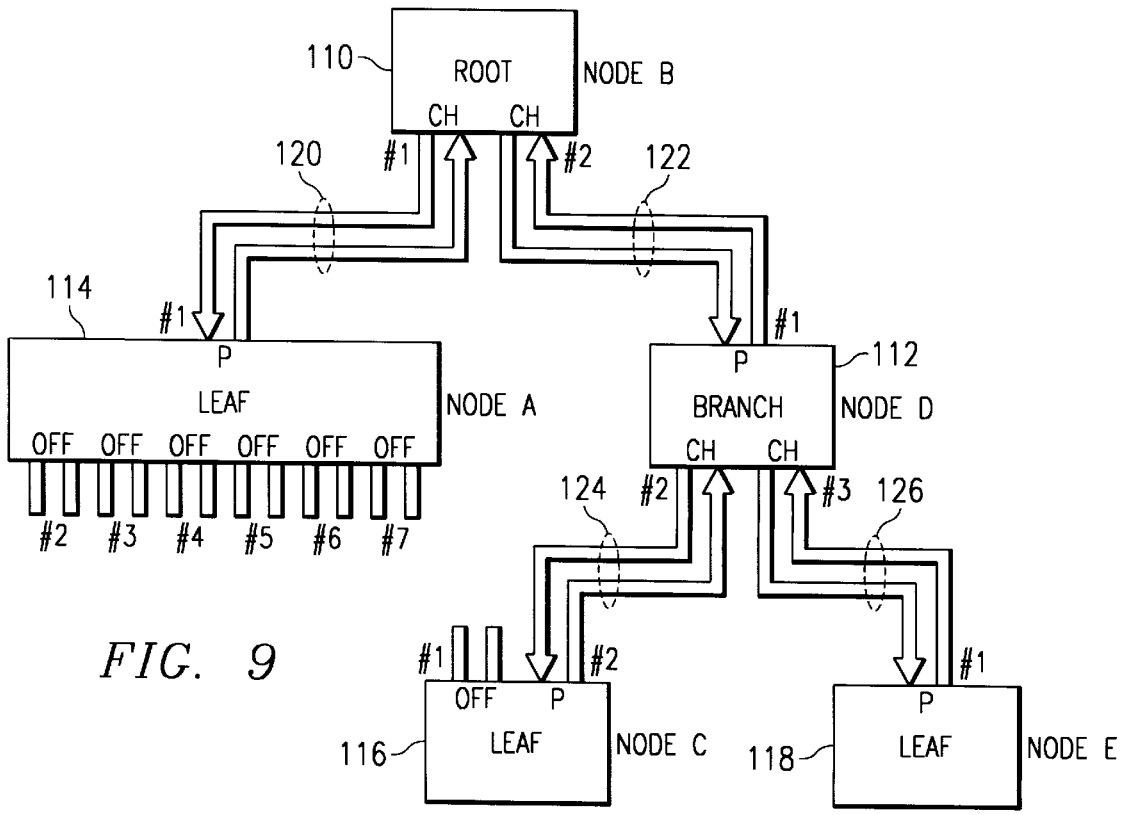
FIG. 9 illustrates a diagrammatic view of the tree of the cable state after the tree identify operation is complete.

In FIG. 9, the node 110 is determined to be the root node. However, it is noteworthy that the selection of the root node is not topology dependent. It is completely acceptable that the root node also be a leaf. The only requirement is that the cycle master (not shown) also has to be the root, since the root has the highest natural priority. In general, asynchronous arbitration is utilized whenever a link layer wants to send packets "as soon as possible," and this is only adequate for nodes that do not require a guaranteed high bandwidth or low latency or a precise timing reference. Data such as that related to digital sound or instrumentation are more efficiently handled with isochronous arbitration. This is facilitated by giving the highest priority access to a "cycle master" that maintains a common clock source. This cycle master attempts to transfer the special time request called a "cycle start" at specific intervals set by a "cycle synch" source. If a transfer is in progress when the cycle synch occurs, then the cycle start will be delayed, causing significant jitter in the start time of the transfer. In addition to having the highest natural priority, the node that has all of its connected ports identified as children becomes the root. A particular node can bias itself toward becoming the root by delaying participation in the tree-ID process. Usually, the node that waits the longest time becomes the root.

Once the tree topology has been determined, the next step is to provide each node an opportunity to select a unique physical ID and identify itself to any management entity attached to the bus. This is required to facilitate low-level power management and the building of a system topology map needed to determine the speed capabilities of each data path.

The self-ID process utilizes a deterministic selection process, wherein the root node passes control of the media to the node attached to its lowest numbered connection port and then waits for that node to send an "ident_done" signal indicating that it and all of its children have identified themselves. The root then passes control to its next highest port and waits for that node to finish. When the nodes attached to all of the ports of the root are finished, the root itself does a self-identify. The child node utilizes the same process in a recursive manner: the completion of a self-ID process is indicated by the bus going idle for a subaction gap.

Sending the self-ID information is done by transmitting one to four very short packets at the base rate onto the cable that include the physical ID. The physical ID is simply the count of the number of times a node passes through the state of receiving self-ID information before having its own opportunity to send self-ID information, i.e., the first node sending self-ID packet(s) chooses 0 as its physical ID, the second chooses 1, and so on. A node is not required to decode the self-ID packet; it merely has to count the number of self-ID sequences since the bus reset (this is the number of times the self-ID receive state is entered). The management information included in the self-ID packet includes gaps for the gap timer settings, the power needed to turn on the attached link layer, the state of the various ports (unconnected, connected to child, connected to parent), and data rate limitations.

Figure 10:
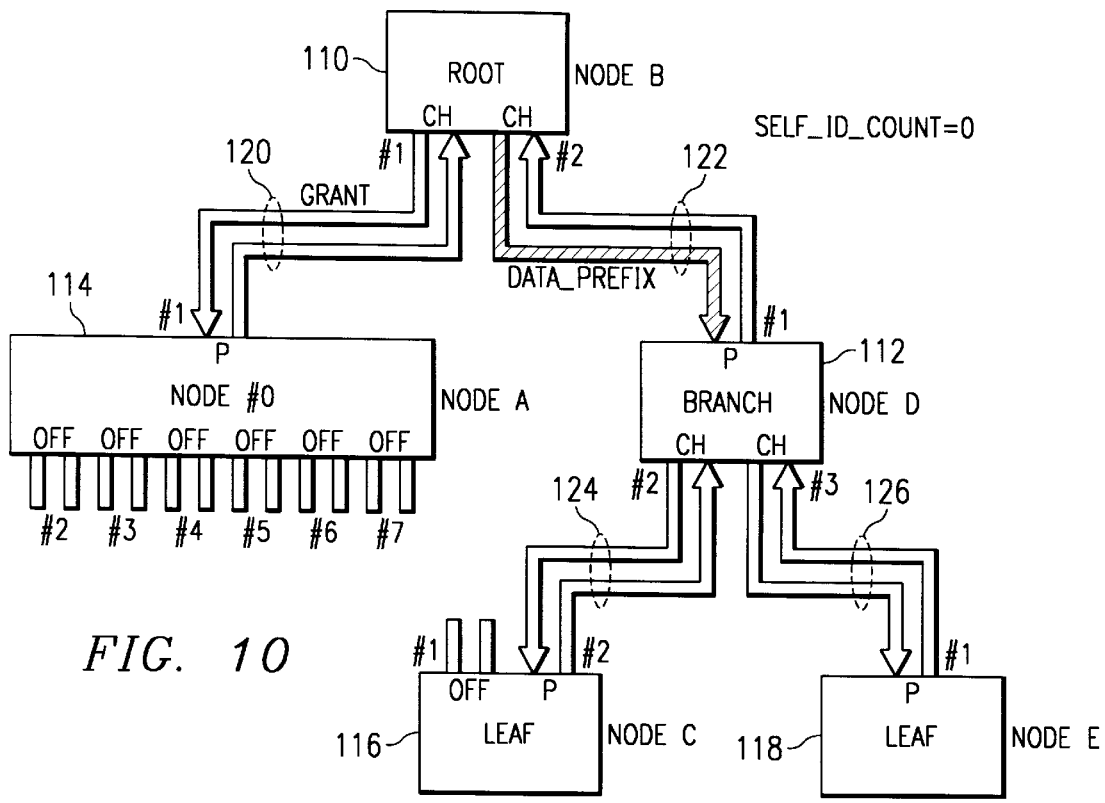
FIGS. 10–19 illustrate the cable states for the self ID process from start to finish.

Referring now to FIGS. 10–19, there are illustrated diagrammatic views of the sequence of operations required for a self-ID process. In this example, there are illustrated the five nodes 110–118 with the state illustrated in FIG. 10 illustrating the state of the self-ID process immediately following the tree-ID process. At this point, the "self_ID_count" values of all nodes are set equal to "0." The root starts this process by sending a grant to its lowest number identified port in a data_prefix to all other ports. Note that an unconnected port is automatically flagged as self-identified. The grant from the root node 110 is sent to node 114 with the data_prefix sent to node 112.

Figure 11:
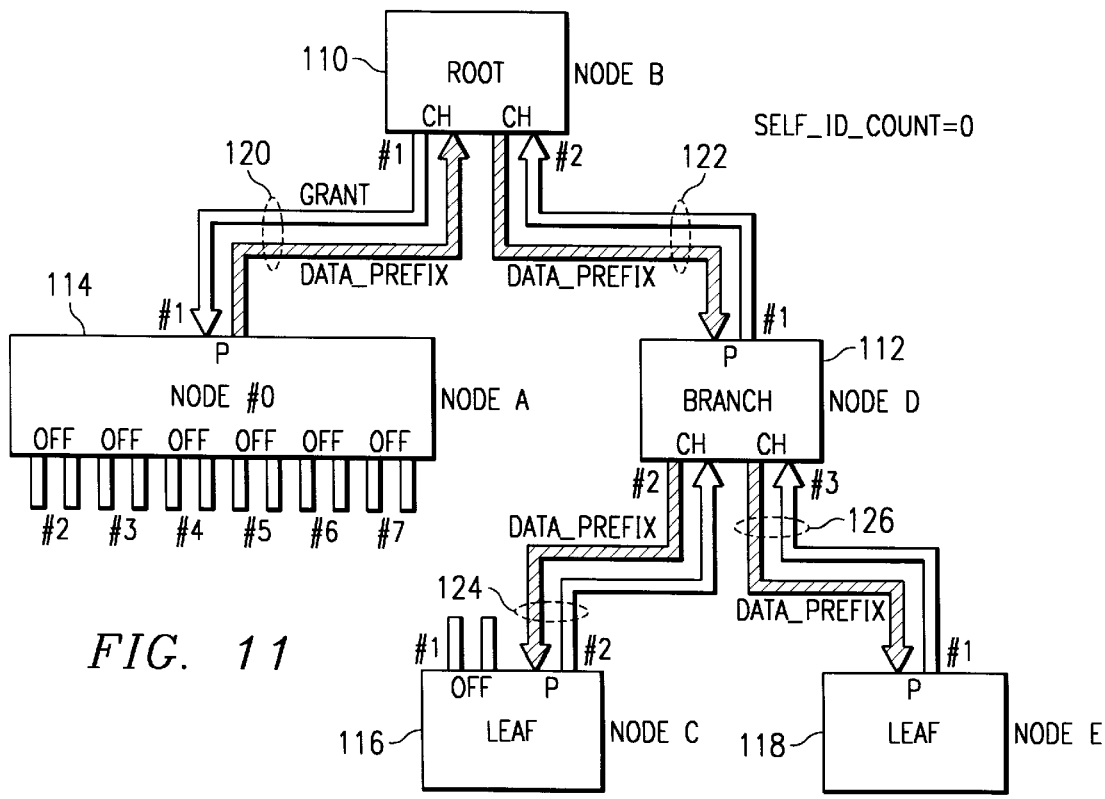

When a node receives the grant, the node 114 in FIG. 10, it propagates to its lowest numbered identified child port or, if there is no requesting child, takes the current value of the self_ID_count as its node ID and starts sending its self-identification information. The start of this information is indicated by a data prefix. This is illustrated in FIG. 11 wherein the data_prefix is sent from node 114 to node 110. When the root node 110 sees this data_prefix, it then withdraws its grant to node 114. Meanwhile, node 112, the other node connected to the child port of node 110, has seen the data_prefix sent by node 110, and it therefore propagates the data_prefix to its children on physical connections 124 and 126, nodes 116 and 118, respectively. At this point, the data_prefixes are all directed away from node 114, such that it can start sending the self-ID information. This is encoded in small 32-bit packets, with the first packet containing power requirements, performance capabilities, and the status of the first four ports. In this example, it is noted that node 114 has seven ports, and therefore needs to send a second self-ID packet to identify itself fully. The first packet is terminated with the data_prefix, which holds the bus until the second packet is sent. The second packet terminates normally with the data_end. All other nodes see the normal packet termination and utilize this event to increment their self_ID_count. Note that the bus-holding termination of the first ID packet does not cause a self_ID_count to be incremented. Additionally, all self-ID packets are sent at the base rate (98.304 Mbit/s).

Figure 12:
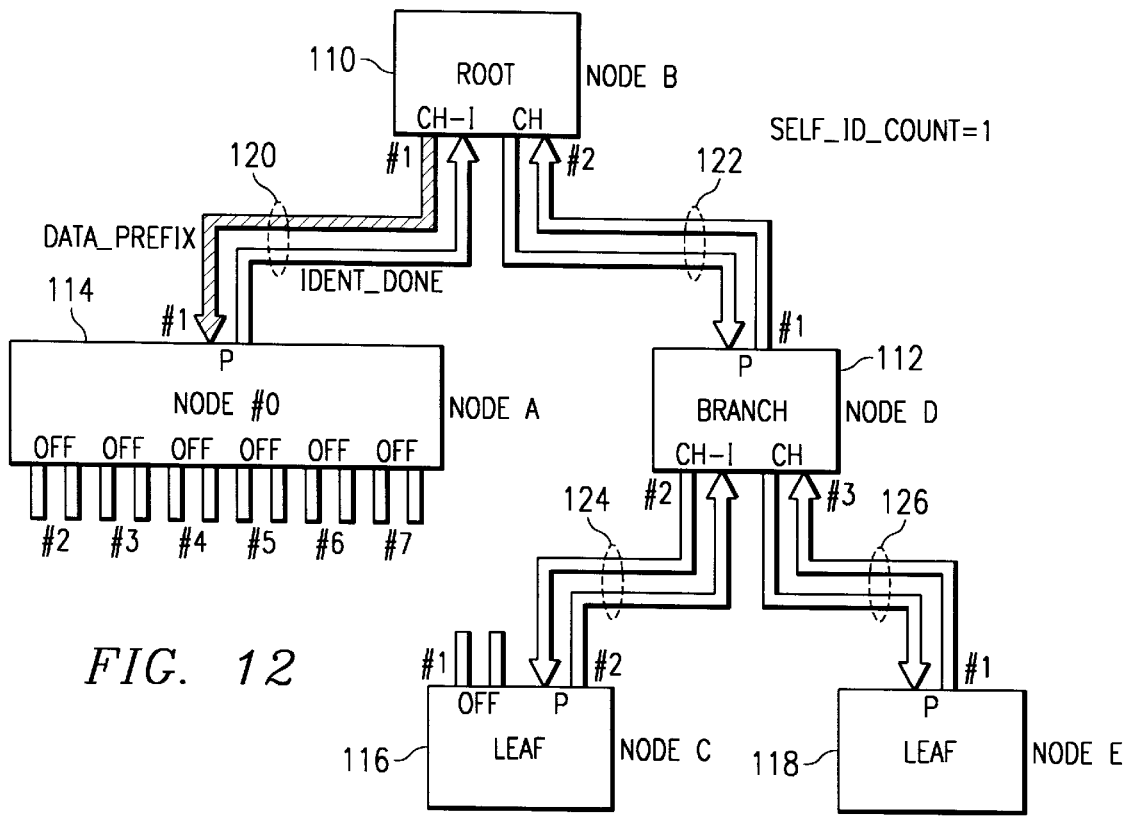

When node 114 finishes sending its self-ID packets, it then sends an ident done to its parent, node 110. The parent node 110 flags that port as identified, sends a data_prefix to the node 114, and then continues to send idle to its other ports. This state is illustrated in FIG. 12. When node 114 sees the data_prefix from the parent node 110, it then leaves self-ID mode and, at this time, could start normal arbitration. However, as long as the self-ID process, there will never be an idle period long enough for the physical layer to request the bus. Nodes 112, 116 and 118 respond to the idle by incrementing their self_ID_count value.

Figure 13:
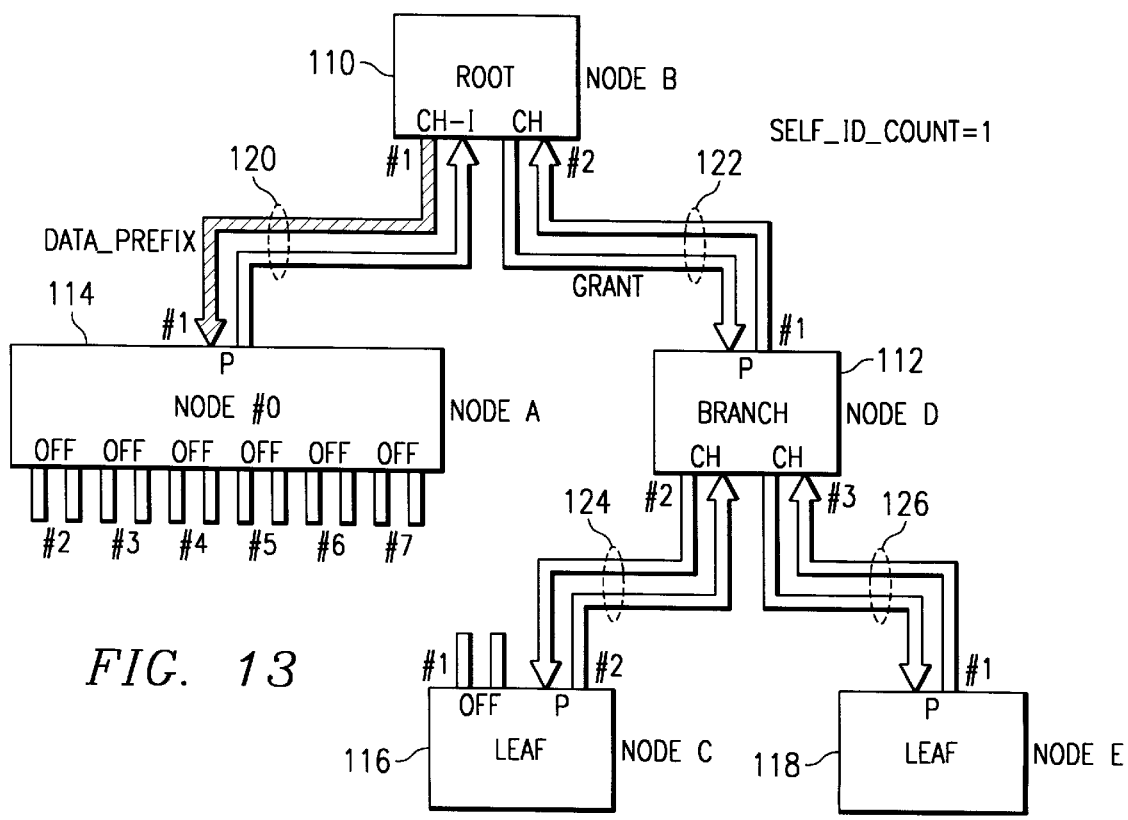
Figure 14:
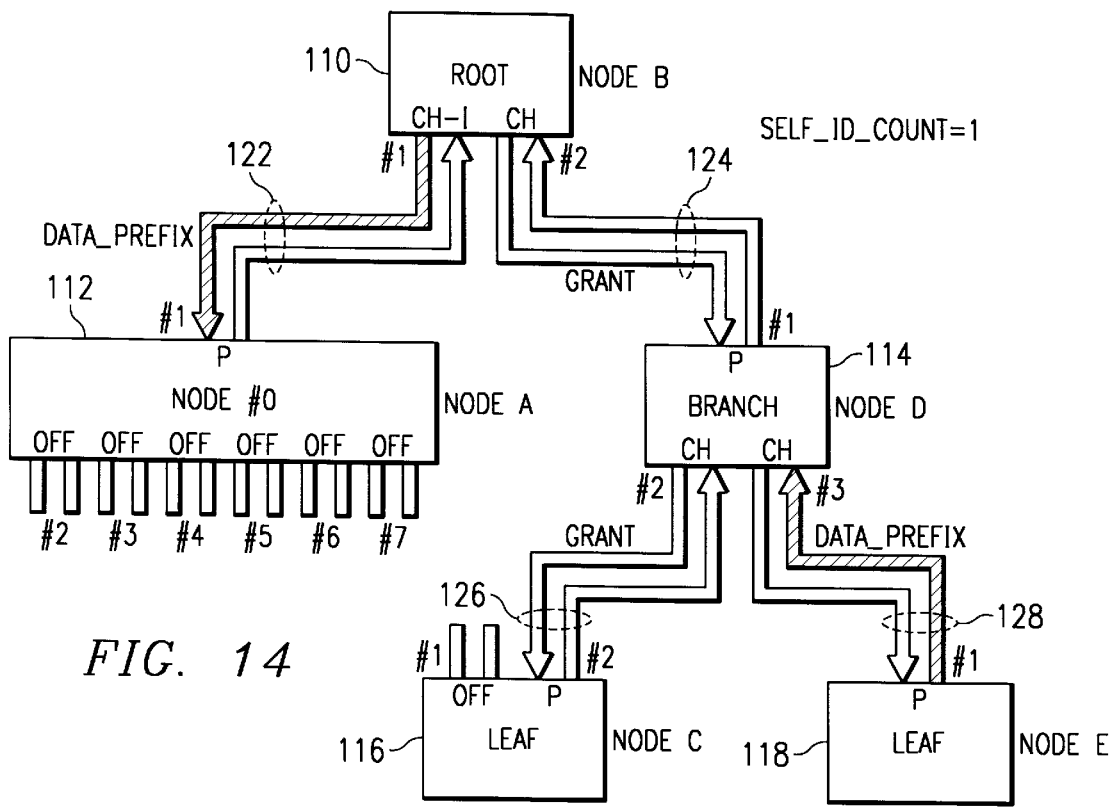

In the next step, illustrated in FIG. 13, node 110, the root node, sends a grant to its lowest numbered identified child port, the one connected to node 112. It also sends a data_ prefix to its other ports, that being the one connected to node 114. This indicates the start of a bus grant for the second node of self-identity. The next step, illustrated in FIG. 14, requires that node 114, having unidentified child ports, to pass a grant from node 110 to its lowest numbered node, node 116, and then sends a data_prefix to the other child ports, that being node 118. This constitutes the finish of the bus grant for the second node self-identity.

Figure 15:
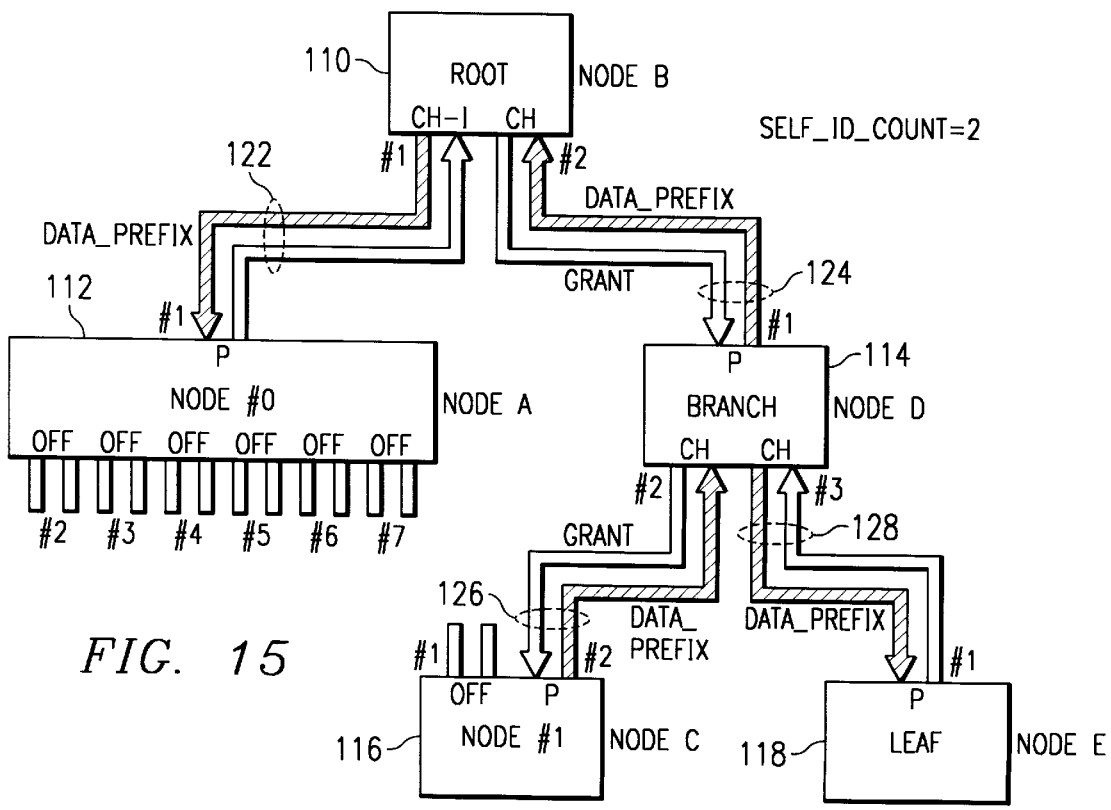

Node 116, as noted hereinabove, does not have any unidentified children. Therefore, it responds by taking the value of self_ID_count as its node_ID, sending a data_ prefix and a single self-ID packet as illustrated in FIG. 15. Only a single self-ID packet is required, since node 116 has only a single pair of ports. As the other participating nodes see the normal termination line state at the end of the self-ID packet, they all increment their self-ID counters. Node 112 has already left the self-ID process; therefore, it sees all successive self-ID packets as normal receive packets.

Figure 16:
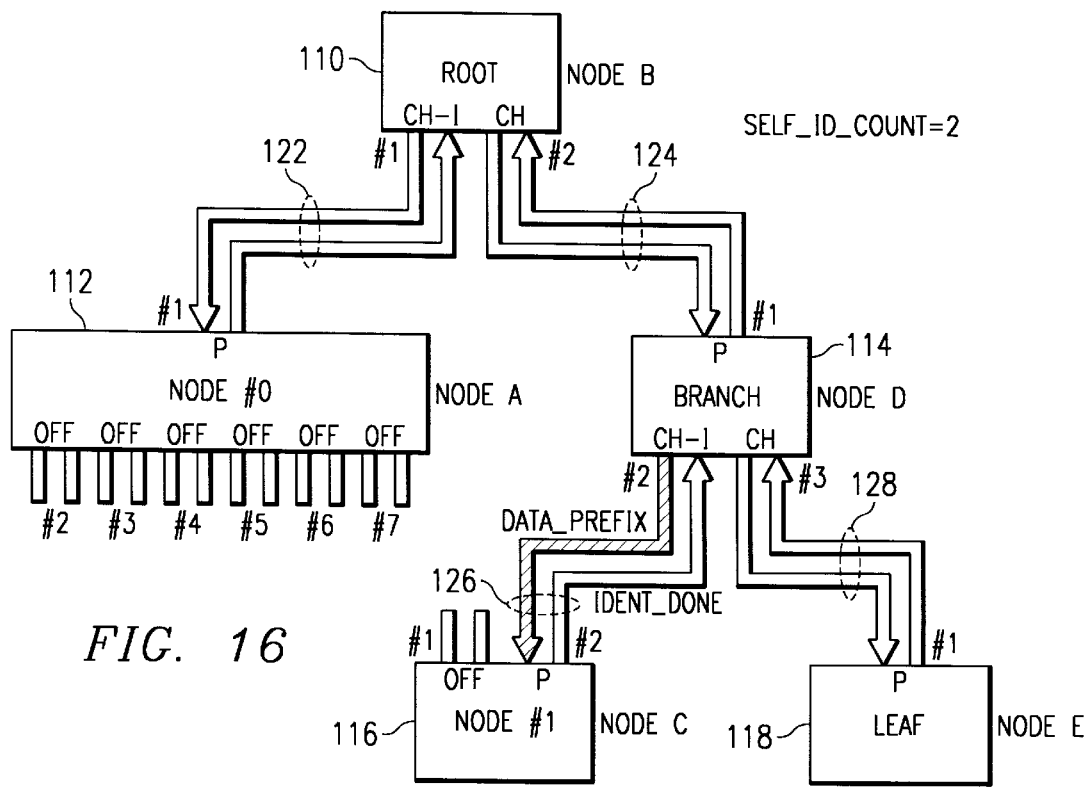

In the next step, illustrated in FIG. 16, node 116 sends an ident_done to its parent node, node 114. Node 114 then responds by labeling that port as identified, sending a data_prefix on the newly identified port and continuing to send an idle on each of its other ports, the child port connected to physical connection 128 and node 118.

Figure 17:
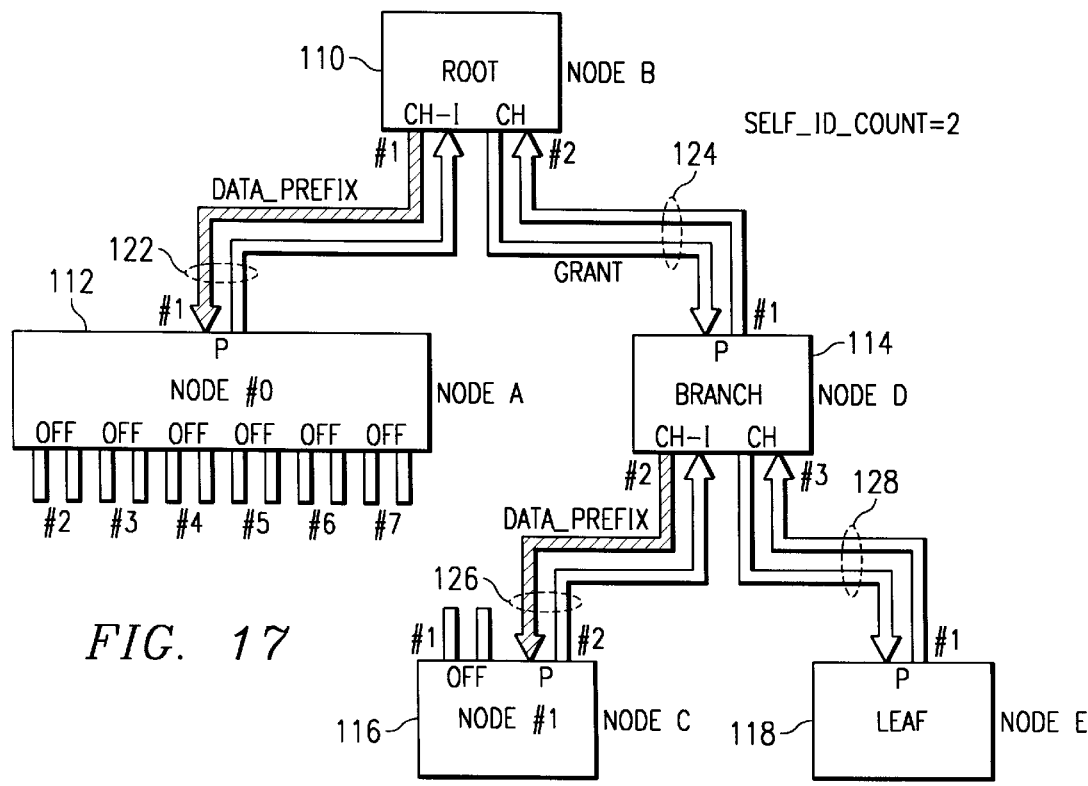

The next step, that depicted in FIG. 17, indicates the start of grant to a third self-identify process. When node 110 (the root node) receives the idle, it then sends a grant to its lowest numbered unidentified child port, the one connected to node 114. It also sends a data_prefix to its other ports, that to node 112. This is the same process described hereinabove with reference to FIG. 13, since node 114 has not yet signaled its self-ID completion. However, it is noted that, since node 116 is identified, the data_prefix will be transmitted thereto.

Figure 18:
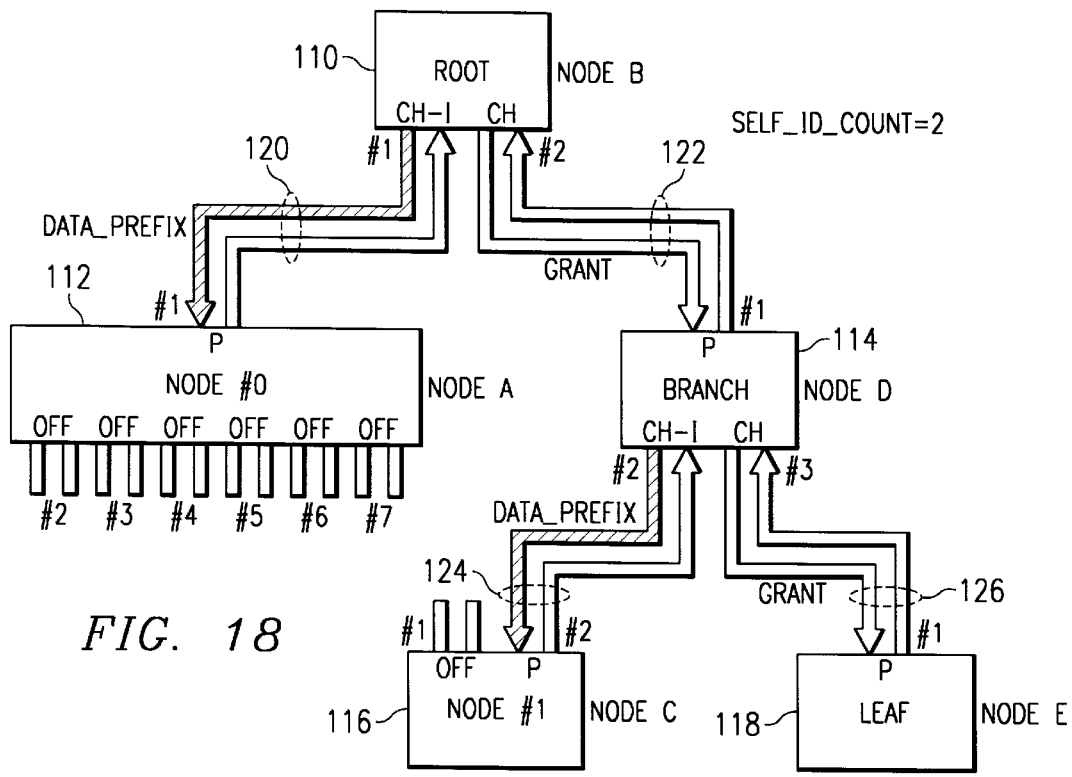
Figure 19:
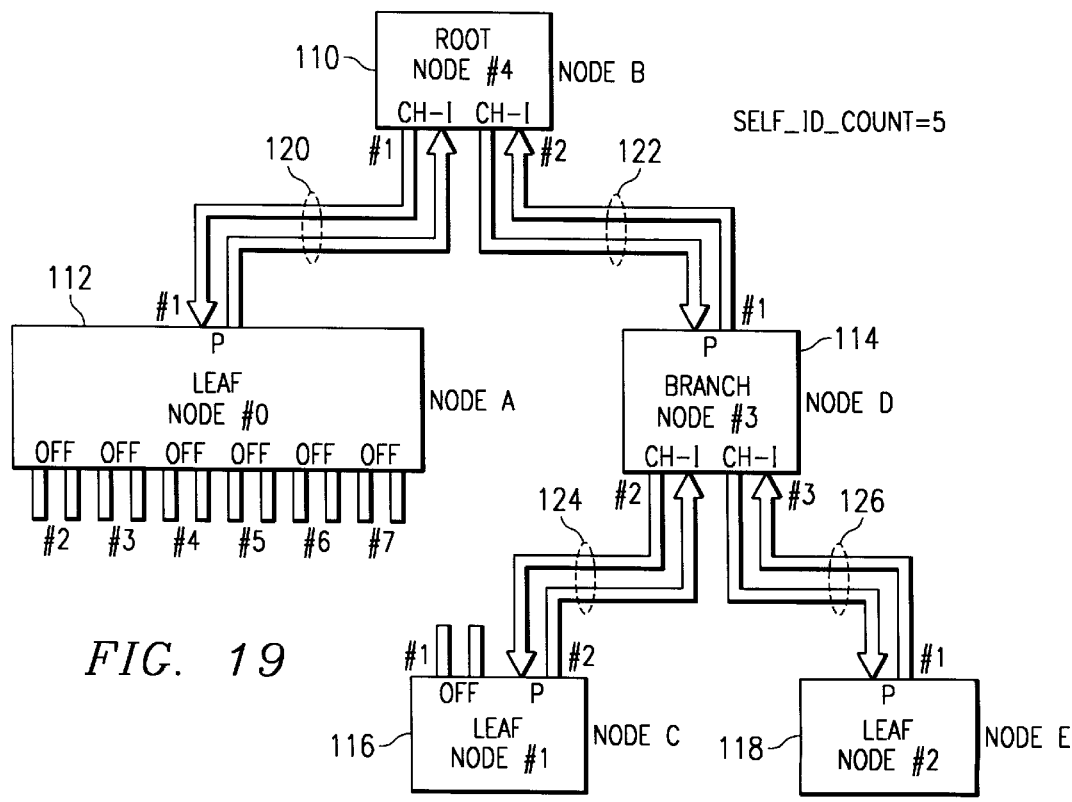

In the next step, that of completing the grant in the third self-identify step, illustrated in FIG. 18, after node 114 receives the grant, it then propagates it to its lowest number unidentified child port (that being port #3), which is connected to node 118. Node 118 then has the opportunity to send self-ID information. When it is finished, it will signal node 114, which will label its port #3 as identified. Node 110 will then send a grant down to its port #2 a third time, which will finally allow node 114 to send its self-identify information, since all of its child ports are now labeled as identified. When finished, node 114 will send the ident_ done to node 110, the root node.

The root node 110 will be the last node to send its self-ID information, and when it is finished, it leaves the self-ID process itself and sends idle out to all its child ports. All nodes exit the self-ID process with their fair bits cleared such that the bus will generally stay idle for the duration of an arbitration reset gap, unless an overeager node initiates a higher priority bus request. At this point, each node has a unique node number, and the self-ID information has been broadcast, the cable state illustrated in FIG. 19 for the self-identity phase. It is noted that the terminology "ch-i" indicates an identified child node.

Referring now to FIG. 20, there is illustrated a depiction of the bus initialization process along a time line. The bus initialization is illustrated as a bus reset point, wherein the system goes through a bus reset phase and then a tree-ID phase. The self-ID packets are then transmitted followed by an idle, this constituting the end of the subaction gap status. This is described hereinabove.

Referring now to FIG. 21, there is illustrated a diagrammatic view of a self-ID packet. As noted hereinabove, the cable physical layer sends one to four self-ID packets at the base rate during the self-ID phase of arbitration. The number of self-ID packets sent depends on the maximum number of ports it has. The cable physical layer of self-ID packets have a format that is illustrated in FIG. 21. In FIG. 21, there is illustrated the configuration of the initial self-ID packet, that labeled "0" and the remaining self-ID packets labeled "#1," "#2" and "#3." The field of the self-ID packets are illustrated in the following Table 1.

TABLE 1

| Field | Derived from | Comment |
|---|---|---|
| 10 | | Self-ID packet identifier. |
| phy_id | physical_ID | Physical node identifier of the sender of this packet. |
| L | link_active | If set, this node has an active Link and Transaction Layer |
| gap_cnt | gap_count | Current value for the PHY_CONFIGURATION.gap_count field of this node. |
| sp | PHY_SPEED | Speed capabilities: |
| | | 00    98.304 Mbit/s |
| | | 01    98.304 Mbit/s and 196.608 MBit/s |
| | | 10    98.304 Mbit/s, 196.608 Mbit/s, and 393.216 Mbit/s |
| | | 11    Reserved for future definition |
| del | PHY_DELAY | Worst-case repeater data delay: |
| | | 00    ≦144 ns(~14/BASE_RATE) |
| | | 01    Reserved |
| | | 10    Reserved |
| | | 11    Reserved |
| c | CONTENDER | If sent and the link_active flag is set, this node is a contender for the bus or isochronous resource manager as described in 8.4.2. |
| pwr | POWER_CLASS | Power consumption and source characteristics: |
| | | 000    Node does not need power and does not repeat power |
| | | 001    Node is self-powered and provides a minimum of 15W to the bus |
| | | 010    Node is self-powered and provides a minimum of 30W to the bus |
| | | 011    Node is self-powered and provides a minumum of 45W to the bus |
| | | 100    Node may be powered from the bus and is using up to 1W |
| | | 101    Node is powered from the bus and is using up to 1W. An additional 2W is needed to enable the link and higher layers |
| | | 110    Node is powered from the bus and is using up to 1W. An additional 5W is needed to enable the link and higher layers |
| | | 111    Node is powered from the bus and is using up to 1W. An additional 9W is needed to enable the link and higher layers |
| p0 . . . p26 | NPORT, child[NPORT], connected[NPORT] | Port status: |
| | | 11    Connected to child node |
| | | 10    Connected to parent node |
| | | 01    Not connected to any other PHY |
| | | 00    Not present on this PHY |

TABLE 1-continued

| Field | Derived from | Comment |
| --- | --- | --- |
| i | initiated_reset | If set, this node initiated the current bus reset (i.e., it started sending a bus_reset signal before it received one). (Optional. If not implemented, this bit shall be returned as a zero.) |
| m | more_packets | If set, another self-ID packet for this node will immediately follow (i.e., if this bit is set and the next self-ID packet received has a different phy_ID, then a self-ID packet was lost). |
| n | | Extended self-ID packet sequence number (0 through 2, corresponding to self-ID packets #1 through #3). If n has the value of 3 through 7, then the rsv, pa-ph, r, and m fields in FIG. 4–18 are reserved. |
| r, rsv | | Reserved for future definition, set to zeros |

Referring now to FIG. 22, there is illustrated a block diagram of the prior art method for handing the self-ID packets. In FIG. 22, the IEEE 1394 serial bus is illustrated as a bus 140, which is interfaced to a physical layer 142. The physical layer 142, as described hereinabove, is responsible for interfacing with the serial bus and therefore has associated therewith a physical interface 144 for passing data from the bus 140 to a receiver 146 during reception of data, and receive data from a transmitter 148 during transmission of data. When transmitting data, a host interface 150 is operable to buffer transmit data in a transmit FIFO 152 for input to the transmitter 148. The receiver 146, however, is operable to receive different packets of data. These are asynchronous packets which are transmitted on a bus 154 to a receive FIFO 156, isochronous packets transmitted on a bus 158 to the receive FIFO 156, and self-ID packets transmitted on a bus 160 to the FIFO 156. The buses 154, 158 and 160 are illustrated as separate buses for purposes of this example.

The FIFO 156 can be interfaced with the host interface 150 to a system bus 162, this, as noted hereinabove, being the 32-bit bus for this embodiment. Host interface 150 interfaces with various general purposes registers 164 that are part of the host operating system and will not be described herein. One of the disadvantages to the above-noted system is that the software operates such that all of the self-ID packets received from the bus 140 are stored in the FIFO 156 for later evaluation by the host interface 150. When the host interface 150 evaluates the self-ID packets, it can determine if there is an integrity problem with the self-ID packets and, therefore, can initiate the bus reset to start the bus initialization, tree-ID and self-ID processes all over. This, therefore, requires a relatively large receive FIFO to store all of the self-ID packets.

Figure 23:
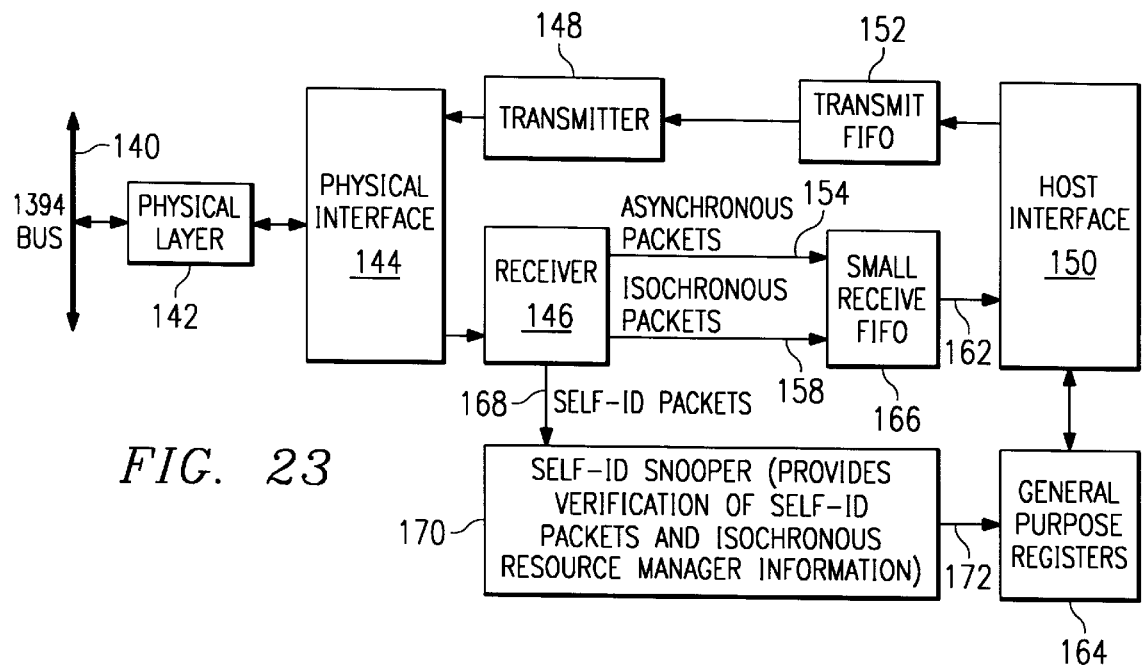
FIG. 23 illustrates the transmitter/receiver of the present invention.

Referring now to FIG. 23, there is illustrated a block diagram depicting the preferred embodiment of the present invention. In this embodiment, the received asynchronous packets and the isochronous packets are still received on the busses 154 and 158, but are stored in a smaller FIFO 166. The FIFO 166 is smaller since it is not, in the preferred embodiment, going to be utilized to store the self-ID packets. The self-ID packets are passed through a bus 168 to a hardware "self-ID snooper" 170, which is operable to provide verification of the self-ID packets and isochronous resource manager information, and only transmit the verification information to the general purpose registers 164 via a bus 172. The host interface 150 does not perform the verification. Since the verification is performed in the hardware, it is substantially faster. During this monitoring procedure, the following operations are monitored:

1. Monitor and verify the integrity of each self-ID packet;
2. Monitor and record the number of nodes in the network;
3. Monitor and verify the Gap Count reported by each self-ID packet; and
4. Monitor and record the IRM node ID.

Figure 24:
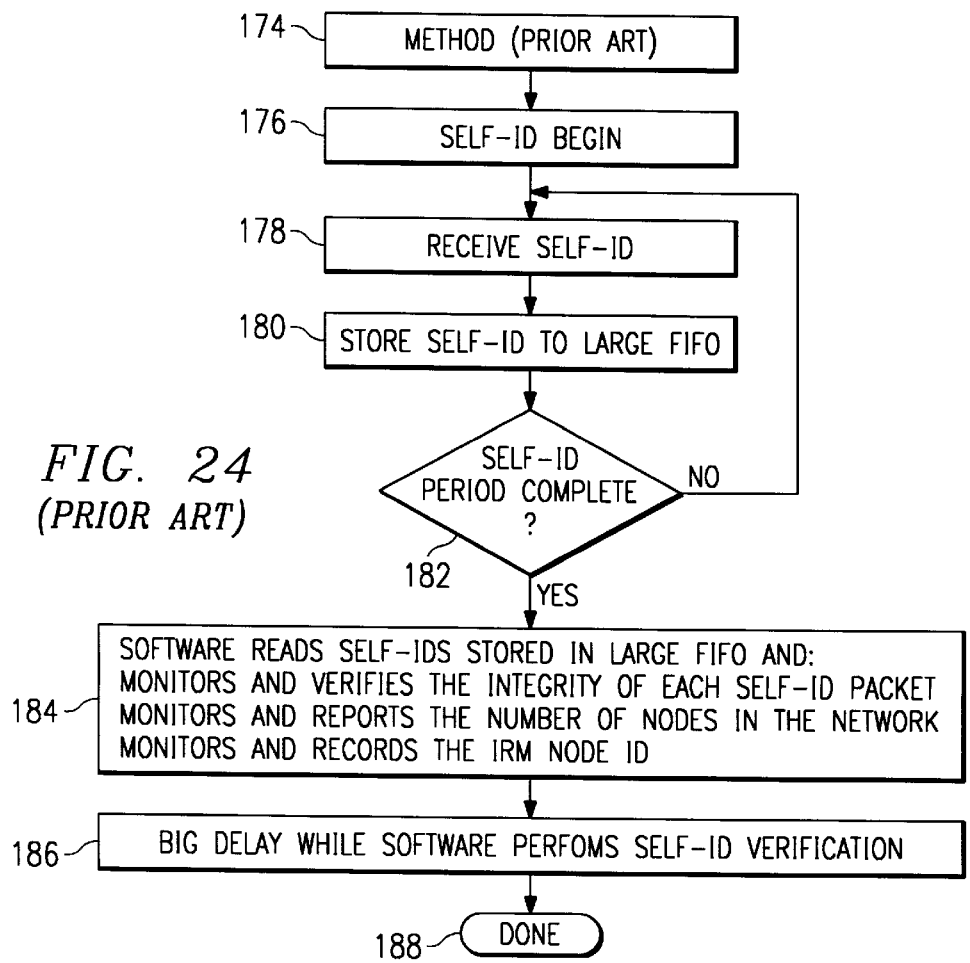
FIG. 24 illustrates a flow chart of the prior art operation of processing self ID packets.

For comparison purposes, the prior art process will be described with reference to the flow chart in FIG. 24, as compared to the operation of the self-ID snooper in the flow chart of FIG. 25. With specific reference to the flow chart of FIG. 24, the process is initiated at a block 174, and then proceeds to a block 176 wherein the self-ID process begins. The system then flows to a block 178 to receive the self-ID packet, and then to a block 180 to store the self-ID packet to the FIFO 156. This will continue looping back through an "N" path to the block 178 until the self-ID period is complete. At this point, the program will flow along a "Y" path from the decision block 182 to a function block 184 wherein the software of the host interface system 150 will read the self-ID packets stored in the FIFO 156 and then perform the following processes:

1. Monitor and verify the integrity of each self-ID packet;
2. Monitor and report the number of nodes in the network; and
3. Monitor and record the IRM node ID.

The program will then flow to a block 186, indicating the actual processing operation, which results in a large delay for the self-ID verification. The program then flows to a block 188 to end the process.

Figure 25:
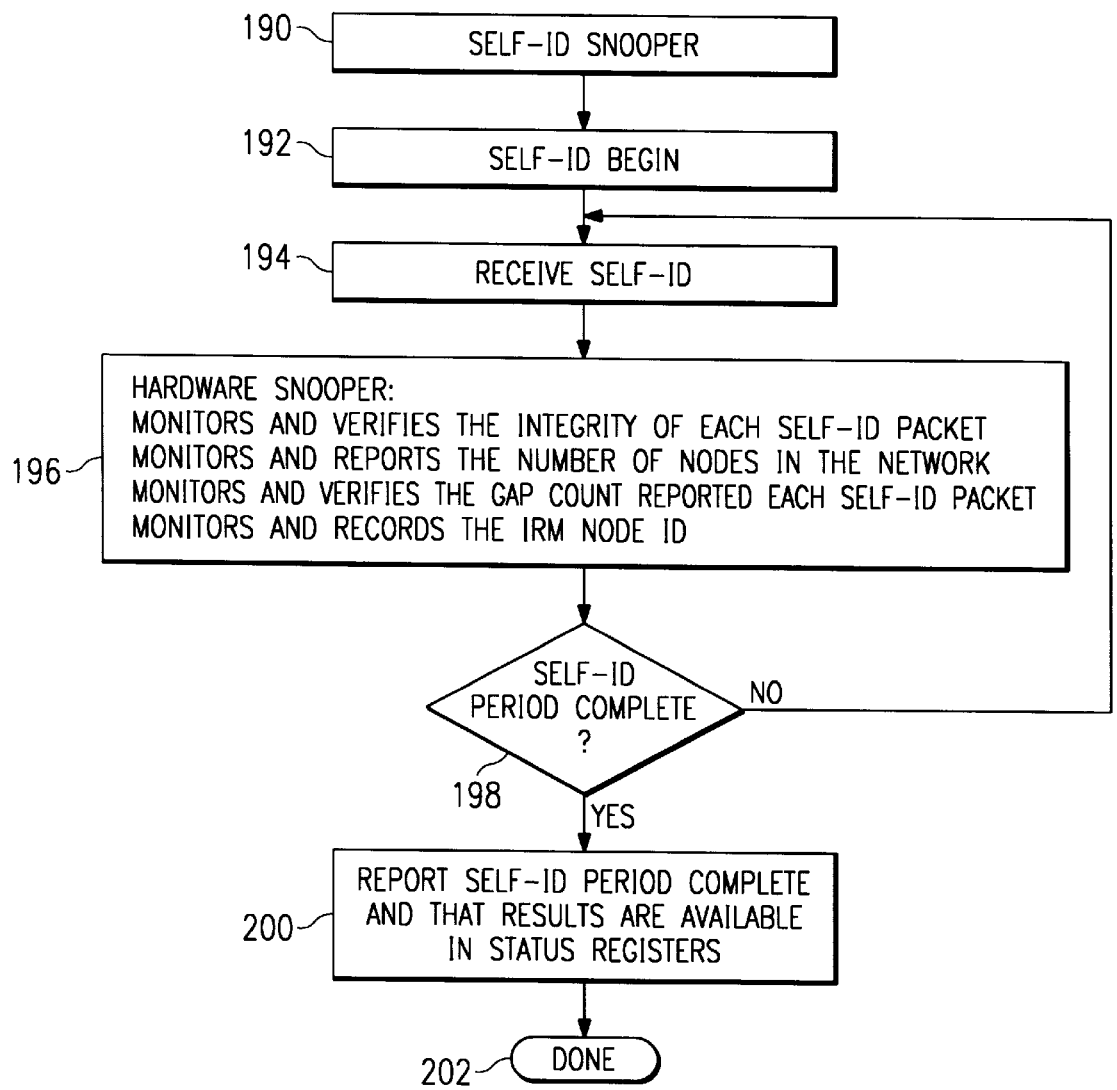
FIG. 25 illustrates a flow chart depicting the operation of the block diagram of FIG. 23.

With reference to FIG. 25, there is illustrated a flow chart depicting the operation of the embodiment of FIG. 23. The process is initiated at a block 190, and then proceeds to a block 192 wherein the self-ID process is initiated. The program then flows to block 194 to receive the self-ID packet from the bus, and then to a block 196. Block 196 indicates the operation of the self-ID snooper block 170. This performs the above-noted operations of the block 170 for verifying the integrity of each ID packet, reporting the number of nodes in the network, verifying the Gap Count reported in each self-ID packet, and recording the IRM node ID. This is all done in hardware and, therefore, proceeds at a relatively higher speed than that of the process of FIG. 24 and does not require processor time of the host interface 150. This is done "on the fly." Once this is achieved for the given received self-ID packet, the program will flow to the function block 198 to determine if the self-ID period is complete. If not, the program will flow along the "N" path back to the block 194 to receive the next self-ID packet. Once the period is complete, the program will flow from decision block 198 along a "Y" path to a function block 200 to report that the self-ID period is complete and that results are available in the various status registers 164. The program will then flow to a Done block 202. The implementation of the flow of block 196 is facilitated with an ASIC (Application Specific Integrated Circuit). As is well known in the art, this process flow can be implemented in the initial design of the ASIC which, although it does involve the generation of various hardware configurations, implementation of various logic gates, etc., block diagrams are seldom generated for the implementation of such a process flow illustrated in FIG. 25. The implementation is done with a design flow, this design flow attached hereto, which logic is described in Verilog Hardware Description Language.

Each of the nodes contains information referred to as a "gap count" relating to bus idle timing information. This information relates to timing of transmission of data over the serial bus. If, for some reason, a particular node must transmit at a slower rate, it will have a lower gap count number. When each of the nodes enters into the self-ID phase, it will transmit as a part of the self-ID packet gap count information relating to that node. For example, if one node had a gap count of 60, another node of 70 and another node of 80, this would represent that they have slightly different timing requirements on the bus. However, it is important that all of the nodes operate at the same gap count. Therefore, if a node at 70 were to receive the self-ID packet from the node at 60, it would recognize the lower gap count and would change the gap counter internal thereto to a value of 60. However, it would still transmit its original gap count information at gap count 70 to the other nodes. The node at gap count 80 would receive the self-ID packets from the node at gap count 60 and the node at gap count 70 would recognize that the node at gap count 60 was lower and set its gap counter to that gap count value. This information is stored in the general registers and, at a later time, the timing requirements of that particular node will be changed to the lower value (assuming that node did not have the lowest gap count). It is noted that utilizing the hardware snooper of the present invention, it is not necessary to evaluate each of the self-ID packets after receipt of all self-ID packets but, rather, a hardware snooper can merely extract the gap count information from a self-ID packet, perform the compare operation and then only store the lower value. This removes the requirement of storing the self-ID packets and all the gap count information for all of the received self-ID packets.

Referring now to FIG. 26, there is illustrated a flow chart depicting the operation of the isochronous resource manager protocol processor. This is initiated at a decision block 204, which loops back on itself until a bus reset is generated. Upon detecting a bus reset, the program will flow to a function block 206 to a bus reset start operation and invalidate the self-ID/IRM data. The program will flow along a path 208 to a decision block 210 to determine if the Subaction Gap has been received. If so, the program will flow to a function block 212 to update the local node ID, the node count, the IRM node ID, the results of the self-ID verify, the results of the Gap Count verify and signal bus reset complete and data valid operation, and then flow back to the block 204. However, if the Subaction Gap has not been received, the program will flow to a decision block 214 to wait for the self-ID packet to be received. This will continue to loop back to block 210 until it is received. When it is received, the program will flow to a function block 216 to update the node count, and then to a function block 218 wherein the snooper self-ID process for the candidate IRM is performed. The program then flows to the function block 220 wherein verification of the self-ID packet/quadlet is performed, which requires the following operations:

1. Determine if the inverted quadlet is correct;
2. Determine if the last received self-ID packet is connected to all child ports;
3. Determine if the expected local node ID is equal to the actual;
4. Determine if the received node ID is incremented by one over the previous received node ID (assuming that the receiving node also receives its own self-ID packet) in the received node IDs.
5. Determine if the node IDs are equal in multi-quadlet self-IDs.
6. Determine if the self-ID/inverted-self-ID phase error is present;
7. Determine if there is a node ID increment; and
8. Determine if the Gap Count is correct.

After making the determination noted in block 220, the program will flow to a decision block 222 to determine if the self-ID passes all checks. If so, the program will flow along the "Y" path back to the input of decision block 210 to determine if a received Subaction Gap has been received. If the self-ID does not pass checks, the program will flow along a "N" path to a function block 224 to store the error code, and then to the function block 210. It is noted that the only information now processed by the host system is the error codes.

In summary, there has been provided a serial bus system operating under the EEE 1394 standard for processing the self-ID packets received over the bus during a bus initialization process. A hardware processor is provided which processes each self-ID packet individually and then sends an error code, if necessary, to the host processor system for processing thereof.

Although the preferred embodiment has been described in detail, it should be understood that various changes, substitutions and alterations can be made therein without departing from the spirit and scope of the invention as defined by the appended claims.

```
module   Bus_reset (
         _Reset, NClk,
         contndr,           // mh1
         DataOut, BusReset, FairGap,
         IRMWrite,
         Clearbrerr,
         NodeNumber, Nridvalid, Resid, Nodecnt,   //output
         Root, Brstormint,                        //output
         State, Vstate, Brerrcode                 //output
         );
input            _Reset;
input            NClk;
input            contndr;
input     [31:0] DataOut;
input            BusReset;
input            FairGap;
```

-continued

```
input              IRMWrite;
input              Clearbrerr;
input              Root;
input      [0:5]   NodeNumber;
output             Nridvalid;
output     [0:5]   Resid;
output     [0:5]   Nodecnt;
output             Brstormint;
// BTD 5-22-98
/*
output     [0:1]   State;
output     [0:2]   Vstate;
*/
output             State;
output             Vstate;
output     [0:2]   Brerrcode;
wire               _Reset;
wire               NClk;
wire               contndr;
wire       [31:0]  DataOut;
wire               BusReset;
wire               FairGap;
wire               IRMWrite;
wire               Clearbrerr;
wire       [0:5]   NodeNumber;
wire               Root;
wire               loncon;
wire               selfirstquad;
wire               sel234quad;
wire               selinvertquad;
wire               selfaultquad;
reg        [0:5]   eresid;
reg        [0:5]   eresid_n;
reg        [0:5]   nodeid_n;
reg                Nridvalid;
reg                nridvalid_n;
reg        [0:5]   Resid;
reg        [0:5]   resid_n;
reg        [0:5]   Nodecnt;
reg        [0:5]   nodecnt_n;
reg                Brstormint;
reg                brstormint_n;
always @ (posedge NClk or negedge _Reset)
if (!_Reset)
    Brstormint = 1'h0;
else
    Brstormint = brstormint_n;
always @(posedge NClk or negedge _Reset)
if (!_Reset)
begin
    Nodecent   = #1 1'h0;  //init to 0, only need one #1
    Resid      = 6'h3f;    //init to 3ff
    eresid     = 6'h3f;
    Nridvalid  = 1'h0;
end
else if (BusReset)
begin
    Nodecent   = #1 1'h0;     //init to 0, only need one #1
    Resid      = 6'h3f;       //init to 3ff
    ereside    = 6'h3f;
    Nridvalid  = 1'h0;
end
else
begin
    Nodecnt    = #1 nodecnt_n; //only need one #1
    Resid      = resid_n;
    eresid     = eresid_n;
    Nridvalid  = nridvalid_n;
end
// parameters for state machine
parameter
    idle       = 1'b0,
    cap        = 1'b1;
// state register declarations
reg State, state_n;
//for self id quadlet verification purposes . . .
//how to decide what is a 1st, 2nd(or 3rd or 4th), or inverted
quadlet from a packet??
//for this application use:
```

```
//SelfID Data bits    31 /   30 /   23
// 1st quadlet         1      0      0
// 2/3/4 quadlet       1      0      1
// inverted quadlet    0      1      x
// faulty quadlet      0      0      x
// faulty quadlet      1      1      x
assign selfirstquad = (!DataOut[23] & DataOut[31] &
!DataOut[30]); // first quadlet of self-id packet
assign sel234quad   = (DataOut[23] & DataOut[31] &
!DataOut[30]);   //234 quadlet of self-id packet
assign selinvertquad = (!DataOut[31] & DataOut[30]);
//invert quadlet of self-id packet
assign selfaultquad = ((!DataOut[31] & !DataOut[30]) |
(DataOut[31] & DataOut[30])); //fault
assign loncon = (DataOut[22] & DataOut[11]);
        //link on & contender
//state machine init/operation
always @(posedge NClk or negedge _Reset)
if (!_Reset)   State = #1 idle;
else           State = #1 state_n;
//state machine case statement
always @(State or BusReset or FairGap or IRMWrite or loncon or
selfirstquad or
        NodeNumber of eresid or contndr or
        Resid or Nodecnt or Nridvalid or DataOut
        )
case (State) // $s full_case parallel_case
    idle: begin           //idle********************
         state_n = Defaults(State);   //set up defaults for all
states
         if (BusReset) begin
            nridvalid_n = 1'h0;       //clear ID valid
            state_n = cap;            //wait for new data
         end
         else state_n = idle;
         end //idle********************
    cap: begin   //cap********************
         state_n = Defaults(State);   //set up defaults
for all states
         casex
({BusReset,FairGap,IRMWrite,selfirstquad,loncon}) //$s full_case
            5'b1_xx_x_x:begin         //should not happen
but . . .
                   state_n = cap;    //stay here
                   end
            5'b0_1x_x_x:begin         //FairGap (& no BR)
so we are now DONE
                   nodecnt_n   = Nodecnt;      //hold the
node count
                   eresid_n    = eresid;       //hold the
external res id address
                   nridvalid_n = 1'h1;         //set ID
valid
                   if (contndr & (eresid == 6'h3f)) resid_n =
NodeNumber;                  //loc con & no ext candidates
                        else if (contndr & (NodeNumber > eresid))
resid_n = NodeNumber;   //loc con & hi NodeNumber
                        else if (contndr & (NodeNumber < eresid))
resid_n = eresid;       //loc con & not hi NodeNumber
                        else if (contndr & (NodeNumber == eresid))
resid_n = eresid;       //loc con & error
                        else resid_n = eresid;
                   //not loc con, set resid by eresid
//In this last case, we do not want to be a contender
therefore . . .
//we set resid to the value of eresid (external resolver id)
which may be . . .
//3f if no self-ids came in or . . .
//3f if no contender capable self-id's came in or . .
//the node id of the highest node number with linkon/contender
bits set.
//If a Bus Reset event occurs that is not allowed to terminate
properly with a Fair Gap then . . .
//the resid will stay at 3hf. Also, the signal Nridvalid will
never go to the valid state until . . .
//a Fair Gap after a Bus Reset occurs.
                   state_n = idle;
                   end
            5'b0_00_x_x:begin end
```

-continued

```
                    5'b0_01_0_x:begin end
                    5'b0_01_1_0:nodecnt_n = Nodecnt+1;
                    5'b0_01_1_1:begin
                                    nodecnt_n = Nodecnt+1;
                                    eresid_n = DataOut[29:24];
                                    end
                    default: begin end
                endcase
            end //cap*******************
endcase             //end of state machine
//hack mrn add selfid packet verification logic
wire        verinv;
wire        verphyideq;
reg         verallchild;
reg         verallchild_n;
wire  [0:5]  curphyid;
reg   [0:5]  heldphyid;
reg   [31:0] lastsid;
wire verphyidinc1;
wire verphyidinc2;
reg   [0:2]  Brerrcode;
reg   [0:2]  brerrcode_n;
reg   [0:5]  exnodeid; //expected node id
reg   [0:5]  exnodeid_n;
reg      incby2ok; //phy id increment by 2 is ok
reg      incby2ok_n;
reg          selexinvquad;      //expect as inverted quad
//need to check for +1 or +2 in case this node sent a self id
packet out
assign verphyideq    = (curphyid == heldphyid);
        //current phy id equals last
assign verphyidinc1  = (curphyid == (heldphyid + 6'h1));
        //current phy id = last +1
assign verphyidinc2  = (curphyid == (heldphyid + 6'h2));
        //current phy id = last +2
assign curphyid      = (DataOut[29:24]);
            //current phy id
assign verinv        = (DataOut[31:0] == ~lastsid);
        //current packet is invert of last
always @ (posedge NClk or negedge _Reset)
if (!_Reset)      exnodeid = #1 6'h0;        //init expected node id
else if (BusReset) exnodeid = #1 6'h0;        //init at BusReset
else               exnodeid = #1 exnodeid_n; //get info elsewhere
always @ (posedge NClk or negedge _Reset)
if (!_Reset)       incby2ok = #1 1'h1;       //init inc by 2
else if (BusReset) incby2ok = #1 1'h1;       //init at BusReset
else               incby2ok = #1 incby2ok_n;            //get
info elsewhere
// BTD 5-22-98 to fix out of sync. problem which create Brerrcode
and Brstormint interrupt
/*
always @ (posedge NClk or negedge _Reset)
if (!_Reset)       selexinvquad = #1 1'h1;   //init to one
since first BRF is header quad
else if (BusReset) selexinvquad = #1 1'h1;   //init at
BusReset
else if (IRMWrite) selexinvquad = #1 !selexinvquad;   //toggle
at each IRMWrite
else               selexinvquad = #1 selexinvquad;    //get info
elsewhere
*/
always @ (posedge NClk or negedge _Reset)
if (!_Reset)       selexinvquad = #1 1'h0;   //init to 0
since first BRF is header quad
else if (BusReset) selexinvquad = #1 1'h0;   //init at
BusReset
else if (IRMWrite) selexinvquad = #1 !selexinvquad;   //toggle
at each IRMWrite
//look for all child indication in last selfid packet quadlets
//if this node is root then the last self-id packet received will
not be "all child"
always @ (posedge NClk or negedge _Reset)
if (!_Reset) verallchild = #1 1'h1;     //default to no error
else if (Root) verallchild = #1 1'h1;   //we are root, last
selfid will not be all child
else verallchild = #1 verallchild_n;    //get info elsewhere
always @ (posedge NClk or negedge _Reset)
if (!_Reset)       Brerrcode = #1 3'h0;      //init
```

-continued

```
else if (BusReset)    Brerrcode = #1 3'h0;        //hack mrn 070996 clear on Bus Reset
else if (Clearbrerr)  Brerrcode = #1 3'h0;        //clear error code
else                  Brerrcode = #1 brerrcode_n; //else capture error data
// parameters for state machine
parameter
    vidle    = 1'b0,
    vcheck   = 1'b1;
// state register declarations
reg Vstate, vstate_n;
//state machine init/operation
always @ (posedge NClk or negedge _Reset)
if (!_Reset)    Vstate = #1 vidle;
else            Vstate = #1 vstate_n;
//state machine case statement
always @(Vstate or FairGap or BusReset or IRMWrite or
        verallchild or verphyidinc1 or verphyidinc2 or verphyideq or verinv or
        selfirstquad or sel234quad or selinvertquad or selexinvquad or
        selfaultquad or curphyid of NodeNumber of exnodeid or incby2ok or Brerrcode
        )
case (Vstate) // $s full_case parallel_case
    vidle: begin //vidle********************
        vstate_n = Vdefaults(Vstate);       //set up defaults for all states
        if (BusReset) vstate_n = vcheck;
        else vstate_n = vidle;
    end         //vidle********************
    vcheck:
    begin       //vcheck******************
        vstate_n = Vdefaults (Vstate);      //set up defaults for all states
//hack mrn 070996 this will prevent self-id verifier from getting out of sync when . . .
//BusResets are not properly terminated with a FairGap
        if (FairGap)
        begin                               //self id process is done so . . .
            vstate_n = vidle;               //go to idle and . . .
            if (verallchild != 1'b1) begin  //see if last was all child
                brstormint_n = 1'h1;
                brerrcode_n = 3'h1;         //not all child
            end
            else if ((exnodeid != 6'h0) && (exnodeid != NodeNumber))
            begin           //ERROR
                brstormint_n = 1'h1;
                brerrcode_n = 3'h2;         //expect phyid != phyid
            end
        end
        else if (IRMWrite & selexinvquad) //first check is for inverted quadlet
        begin                               //inverted quad of self id
            if (verinv && selinvertquad)    // check inverted quadlet has correct format
            begin
                brstormint_n = 1'h0;
            end
            else
            begin           //ERROR
                brstormint_n = 1'h1;
                brerrcode_n = 3'h3;         //quad not inverted
                vstate_n = vidle;           //go to idle
            end
        end
        else if (IRMWrite & selfirstquad)
        begin                               //first quad of self id
            if (curphyid == 6'h0) brstormint_n = 1'h0;
            //first self id packet, no increase
            else if (verphyidinc1) brstormint_n = 1'h0;   //if inc by 1, no error
            else if (verphyidinc2 & incby2ok)
            begin                           //if inc by 2 & first time . . .
```

-continued

```
             incby2ok__n     = 1'h0;          //disallow next 2 id icrement
             brstormint__n   = 1'h0;          //no error for now so . . .
             exnodeid__n     = curphyid -1'h1; //save as expected Phy id
because . . .
             end                              //our node id is probably
current phy id -1
        else if (verphyidinc2 & !incby2ok)
             begin              //ERROR
             brstormint__n = 1'h1;
             brerrcode__n  = 3'h4;            // more than 2 inc phyid
             vstate__n = vidle;               //go to idle
             end
        else
             begin              //ERROR
             brstormint__n = 1'h1;
             brerrcode__n   = 3'h5;           //phyid inc by 3+
             vstate__n = vidle;               //go to idle
             end
        end
////////  else if (IRMWrite & selfirstquad)   // mhl
4-15-98. same as previous else if
        else if (IRMWrite & sel234quad)
             begin                            //2,3, or 4 quad of
self id
             if (verphyideq) brstormint__n = 1'h0;
             else
                 begin             //ERROR
                 brstormint__n = 1'h1;
                 brerrcode__n = 3'h6;         //phyid not equal in
packet
                 vstate__n = vidle;           //go to idle
                 end
             end
        else if (IRMWrite & selfaultquad)
             begin              //errored quadlet ERROR
             brstormint__n = 1'h1;
             brerrcode__n  = 3'h7;            //faulty
quadlet
             vstate__n = vidle;               //go to idle
             end
        else vstate__n = vcheck;              //stay and
check some more
             end //vcheck*******************
endcase // Vstate machine
always @ (posedge NClk or negedge __Reset)
if (!__Reset)
begin
        lastsid        = #1 32'h0;
        heldphyid      = 6'h0;          //init the stored phy id
        verallchild__n = 1'h1;          //init to no fail
end
else if (BusReset)
begin                                   //start over
        lastsid        = #1 32'h0;
        heldphyid      = 6'h0;          //init the stored phy id
        verallchild__n = 1'h1;          //init to no fail
end
else if (IRMWrite & DataOut[31:30] == 2'h2 & !DataOut[23])
begin                                   //first
self id pack from node
        lastsid       = #1 DataOut[31:0];  //save self id
packet
        heldphyid   =    DataOut[29:24];    //get the phy id
        begin                              //check this packet to
ensure no parents
        casex ({DataOut[7:2]})
        6'b10xxxx:verallchild__n = 1'h0;
        6'bxx10xx:verallchild__n = 1'h0;
        6'bxxxx10:verallchild__n = 1'h0;
        default:  verallchild__n = 1'h1;   //default
no error
        endcase
        end
end
else if (IRMWrite & DataOut[31:30] == 2'h2 & DataOut[23])
begin                                   //another
self id pack from node
                                        //2,3, or
4th self id packet from node
```

```
                                                     -continued lastsid = #1 DataOut[31:0];            //save self id
packet
        heldphyid = heldphyid;                 //hold stored phy id
        begin                                  //check this packet to
ensure no parents
        casex ({verallchild,DataOut[17:2]})
        17'b0__xxxxxxxx__xxxxxxxx:verallchild__n = 1'h0;    //prior
quad has a parent
        17'b1__10xxxxxx__xxxxxxxx:verallchild__n = 1'h0;    //current
quad has a parent
        17'b1__xx10xxxx__xxxxxxxx:verallchild__n = 1'h0;
        17'b1__xxxx10xx__xxxxxxxx:verallchild__n = 1'h0;
        17'b1__xxxxxx10__xxxxxxxx:verallchild__n = 1'h0;
        17'b1__xxxxxxxx__10xxxxxx:verallchild__n = 1'h0;
        17'b1__xxxxxxxx__xx10xxxx:verallchild__n = 1'h0;
        17'b1__xxxxxxxx__xxxx10xx:verallchild__n = 1'h0;
        17'b1__xxxxxxxx__xxxxxx10:verallchild__n = 1'h0;
        default: verallchild__n = 1'h1;        //default no
error
        endcase
        end
end
else if (IRMWrite)
begin                                          //assume this is
an inverted quad
//inverted self id packet from node
        lastsid = #1 lastsid;                  //hold self id
packet
        heldphyid = heldphyid;                 //hold the phy id
        verallchild__n = verallchild;          //hold the all
child
end
//Default function
function [0:1]    Defaults
input    [0:1]    curstate;
begin
    nodecnt__n   = Nodecnt;
    eresid__n    = eresid;
    resid__n     = Resid;
    nridvalid__n = Nridvalid;
    Defaults     = curstate;
end
endfunction
//second Default function
function [0:2] Vdefaults;
input    [0:2] vcurstate;
begin
    brstormint__n = 1'h0;
    brerrcode__n  = Brerrcode;
    exnodeid__n   = exnodeid;
    incby2ok__n   = vcurstate;
end
endfunction
endmodule
```

What is claimed is:

1. A method for processing packetized identification information over a serial bus carrying data packets, which packetized identification information is utilized by each node in a network for self-identifying itself on the network, and at each node, comprising of the steps of:

monitoring the data packets received from the serial bus during a self-ID process;

recognizing that the data packet received is a self-ID packet, which self-ID packet comprises data placed on the serial bus by other nodes on the serial bus to identify those other nodes to all remaining nodes on the serial bus;

processing each of the recognized self-ID packets with a hardware processor to verify the integrity of the received self-ID packet in accordance with predetermined criteria; and generating an error signal if any of the self-ID packets fails to verify in accordance with the predetermined criteria.

2. The method of claim 1, wherein the step of processing occurs upon receipt of the self-ID packet.

3. The method of claim 1, wherein the step of processing operates without substantially buffering the self-ID packet, such that the received self-ID packet is processed on the fly.

4. The method of claim 1, wherein there is bus idle timing information contained within the self-ID packets transmitted over the serial bus that indicates the bus idle timing information at the transmitting node, and further comprising:

recognizing the occurrence of self-ID packets;

comparing the previous bus idle timing information with the received bus idle timing information; and choosing the larger of the two compared values for the bus idle timing information and setting that value to the current bus idle timing information for use after the self-ID process by the receiving node.

5. The method of claim 1, and further comprising maintaining a count of the self-ID packets received from the serial bus and determining the number of nodes on the bus from which self-ID packets were received, such that a count of the nodes can be maintained at each node.

6. An apparatus for processing packetized information over a serial bus carrying data packets, which packetized identification information is utilized by each node in a network for self-identifying itself on the network, and at each node, comprising:

a bus interface for interfacing to the bus;

a receiver for receiving from said bus interface data from the bus, the data including self-ID packets;

a self-ID processor for recognizing that the data packet received is a self-ID packet, which self-ID packet comprises data placed on the serial bus by other nodes on the serial bus to identify those other nodes to all remaining nodes on the serial bus;

said self-ID processor processing each of the recognized self-ID packets to verify the integrity of each of the received self-ID packets in accordance with predetermined criteria; and said self-ID processor generating an error signal with any of the self-ID packets fails to verify in accordance with the predetermined criteria.

7. The apparatus of claim 6, wherein said self-ID processor operates upon receipt of the self-ID packet to process the recognized self-ID packet.

8. The apparatus of claim 6, wherein said self-ID processor operates without substantially buffering said received self-ID packet, such that the received self-ID packet is processed on the fly.

9. The apparatus of claim 6, wherein there is bus idle timing information contained within the self-ID packets transmitted over the serial bus that indicates the bus idle timing information at the transmitting node, and further comprising:

a subprocessor for recognizing the occurrence of the bus idle timing information within the self-ID packets;

a comparator for comparing previous bus idle timing information with the received bus idle timing information; and said comparator choosing the larger of the two compared values for the bus idle timing information and setting that value in an internal register to the current bus idle timing information for use after the self-ID process by the receiving node.

\* \* \* \* \*